(12) United States Patent
Takahashi et al.

(10) Patent No.: US 11,390,029 B2
(45) Date of Patent: Jul. 19, 2022

(54) THREE-DIMENSIONAL SHAPING APPARATUS, THREE-DIMENSIONAL SHAPING SYSTEM, AND THREE-DIMENSIONAL SHAPED ARTICLE PRODUCTION METHOD

(71) Applicant: SEIKO EPSON CORPORATION, Tokyo (JP)

(72) Inventors: Eizo Takahashi, Nagano (JP); Tsuyoshi Kitahara, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 105 days.

(21) Appl. No.: 16/720,146

(22) Filed: Dec. 19, 2019

(65) Prior Publication Data

US 2020/0198243 A1 Jun. 25, 2020

(30) Foreign Application Priority Data

Dec. 21, 2018 (JP) .............................. JP2018-239194

(51) Int. Cl.
*B29C 64/357* (2017.01)
*B29C 64/393* (2017.01)
(Continued)

(52) U.S. Cl.
CPC .......... *B29C 64/357* (2017.08); *B29C 64/106* (2017.08); *B29C 64/314* (2017.08);
(Continued)

(58) Field of Classification Search
None
See application file for complete search history.

(56) References Cited

U.S. PATENT DOCUMENTS

2014/0117585 A1* 5/2014 Douglas .................. B29C 64/40
264/401
2015/0258734 A1* 9/2015 Okamoto ............... B29C 64/112
235/488

(Continued)

FOREIGN PATENT DOCUMENTS

JP 2006-192710 A 7/2006
JP 2017-177753 A 10/2017

*Primary Examiner* — Matthew J Daniels
*Assistant Examiner* — Paul Spiel
(74) *Attorney, Agent, or Firm* — Global IP Counselors, LLP

(57) ABSTRACT

A three-dimensional shaping apparatus coupled to a server includes a melting portion melting a material to form a shaping material, an ejection portion ejecting the shaping material supplied from the melting portion, a shaping stage where the shaping material ejected from the ejection portion is stacked, a moving mechanism changing a relative position of the ejection portion and the shaping stage, a shape data generation portion generating second shape data for representing a shape of a three-dimensional shaped article including a shape representing identification information for identifying the three-dimensional shaped article using first shape data and the identification information for identifying the three-dimensional shaped article, a controller controlling the melting portion and the moving mechanism according to the second shape data, thereby producing the three-dimensional shaped article, and a communication portion transmitting the identification information for identifying the three-dimensional shaped article and production information of the three-dimensional shaped article to the server.

6 Claims, 14 Drawing Sheets

| SERIAL NO. | PRODUCTION DATE | PRODUCTION SITE | GENERATION | MATERIAL | ... |
|---|---|---|---|---|---|
| ABC12345 | 20XX-XX-XX | Plant A | Gen1 | >ABS< | ... |
| ABC12346 | 20XX-XX-XX | Plant A | Gen1 | >ABS< | ... |
| ABC12347 | 20XX-XX-XX | Plant A | Gen1 | >ABS< | ... |
| ⋮ | ⋮ | ⋮ | ⋮ | ⋮ | |
| ⊟ ABC23456 | 20YY-YY-YY | Plant B | Gen2 | >ABS(REC)< DR | ... |
| ├ ABC12345 | 20XX-XX-XX | Plant A | Gen1 | >ABS< | ... |
| └ ABC12346 | 20XX-XX-XX | Plant A | Gen1 | >ABS< | ... |
| ⋮ | ⋮ | ⋮ | ⋮ | ⋮ | |
| ⊟ ABC34567 | 20ZZ-ZZ-ZZ | Plant A | Gen3 | >ABS(REC)< DR | ... |
| ├⊟ ABC23456 | 20YY-YY-YY | Plant B | Gen2 | >ABS(REC)< DR | ... |
| │├ ABC12345 | 20XX-XX-XX | Plant A | Gen1 | >ABS< | ... |
| │└ ABC12346 | 20XX-XX-XX | Plant A | Gen1 | >ABS< | ... |
| └⊞ ABC23999 | 20XY-XY-XY | Plant C | Gen2 | >ABS(REC)< DR | ... |

(51) Int. Cl.
    *B29C 64/314*    (2017.01)
    *B33Y 70/00*     (2020.01)
    *B33Y 10/00*     (2015.01)
    *B33Y 30/00*     (2015.01)
    *B33Y 50/02*     (2015.01)
    *B29C 64/106*    (2017.01)

(52) U.S. Cl.
    CPC ............ *B29C 64/393* (2017.08); *B33Y 10/00* (2014.12); *B33Y 30/00* (2014.12); *B33Y 50/02* (2014.12); *B33Y 70/00* (2014.12)

(56) References Cited

U.S. PATENT DOCUMENTS

2016/0082665 A1*  3/2016  Snyder .................... B29C 70/68
                                                        700/98
2020/0001536 A1*  1/2020  DeSimone ............ B29C 64/188

* cited by examiner

FIG. 6

| SERIAL NO. | PRODUCTION DATE | PRODUCTION SITE | GENERATION | MATERIAL |
|---|---|---|---|---|
| ABC12345 | 20XX-XX-XX | Plant A | Gen1 | >ABS< |
| ABC12346 | 20XX-XX-XX | Plant A | Gen1 | >ABS< |
| ABC12347 | 20XX-XX-XX | Plant A | Gen1 | >ABS< |
| ... | ... | ... | ... | ... |
| ABC23456 | 20YY-YY-YY | Plant B | Gen2 | >ABS(REC)< DR |
|    ABC12345 | 20XX-XX-XX | Plant A | Gen1 | >ABS< |
|    ABC12346 | 20XX-XX-XX | Plant A | Gen1 | >ABS< |
| ... | ... | ... | ... | ... |
| ABC34567 | 20ZZ-ZZ-ZZ | Plant A | Gen3 | >ABS(REC)< DR |
|    ABC23456 | 20YY-YY-YY | Plant B | Gen2 | >ABS(REC)< DR |
|       ABC12345 | 20XX-XX-XX | Plant A | Gen1 | >ABS< |
|       ABC12346 | 20XX-XX-XX | Plant A | Gen1 | >ABS< |
|    ABC23999 | 20XY-XY-XY | Plant C | Gen2 | >ABS(REC)< DR |
| ... | ... | ... | ... | ... |

THREE-DIMENSIONAL SHAPING APPARATUS, THREE-DIMENSIONAL SHAPING SYSTEM, AND THREE-DIMENSIONAL SHAPED ARTICLE PRODUCTION METHOD

The present application is based on, and claims priority from JP Application Serial Number 2018-239194, filed on Dec. 21, 2018, the disclosure of which is hereby incorporated by reference herein in its entirety.

BACKGROUND

1. Technical Field

The present disclosure relates to a three-dimensional shaping apparatus, a three-dimensional shaping system, and a three-dimensional shaped article production method.

2. Related Art

For example, JP-A-2006-192710 (Patent Document 1) discloses a method for producing a three-dimensional shaped article by extruding a molten thermoplastic material onto a base from an extrusion nozzle scanning according to preset shape data, and further stacking a molten material on the material cured on the base.

When a three-dimensional shaped article is recycled, it is preferred that production information representing production date, manufacturer, materials used for production, etc. can be identified from the three-dimensional shaped article. However, in the method described in Patent Document 1, a case where the three-dimensional shaped article is recycled is not taken into consideration.

SUMMARY

The present application provides a technique capable of identifying the production information from the three-dimensional shaped article.

According to an aspect of the present disclosure, a three-dimensional shaping apparatus coupled to a server is provided. This three-dimensional shaping apparatus includes a melting portion melting a material to form a shaping material, an ejection portion ejecting the shaping material supplied from the melting portion, a shaping stage where the shaping material ejected from the ejection portion is stacked, a moving mechanism changing a relative position of the ejection portion and the shaping stage, a shape data generation portion generating second shape data for representing a shape of a three-dimensional shaped article including a shape representing identification information for identifying the three-dimensional shaped article using first shape data and the identification information for identifying the three-dimensional shaped article, a controller controlling the melting portion and the moving mechanism according to the second shape data, thereby producing the three-dimensional shaped article, and a communication portion transmitting the identification information for identifying the three-dimensional shaped article and production information of the three-dimensional shaped article to the server.

BRIEF DESCRIPTION OF THE DRAWINGS

FIG. 6 is an explanatory view showing one example of history data managed by a server.

DESCRIPTION OF EXEMPLARY EMBODIMENTS

A. First Embodiment

Figure 1:
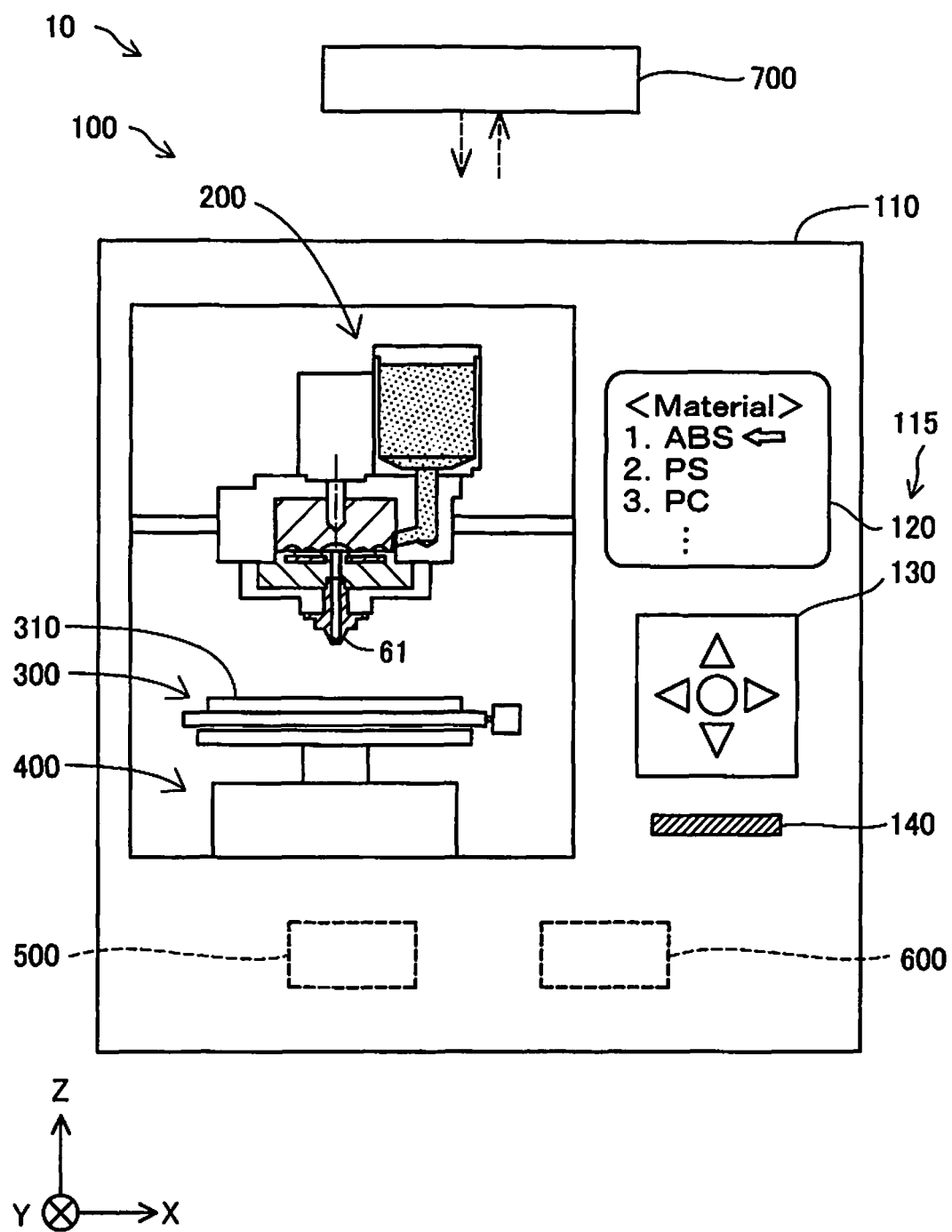
FIG. 1 is an explanatory view showing a schematic configuration of a three-dimensional shaping system in a first embodiment.

FIG. 1 is an explanatory view showing a schematic configuration of a three-dimensional shaping system 10 in a first embodiment. In FIG. 1, arrows along the X, Y, and Z directions orthogonal to one another are shown. The X direction and the Y direction are directions along the horizontal direction, and the Z direction is a direction along the vertical direction. In also the other drawings, arrows along the X, Y, and Z directions are shown as appropriate. The X, Y, and Z directions in FIG. 1 and the X, Y, and Z directions in the other drawings indicate the same directions.

The three-dimensional shaping system 10 in this embodiment includes a three-dimensional shaping apparatus 100 for producing a three-dimensional shaped article, and a server 700 for managing information regarding the produced three-dimensional shaped article. The three-dimensional shaping apparatus 100 in this embodiment includes an ejection unit 200, a shaping stage 300, a moving mechanism 400, a controller 500, and a data processing portion 600. The ejection unit 200, the shaping stage 300, the moving mechanism 400, the controller 500, and the data processing portion 600 are housed in a casing 110. The casing 110 is provided with an operation panel 115 and a reading portion 140.

In this embodiment, the operation panel 115 is constituted by a display portion 120 and an operation portion 130. In the display portion 120, various information regarding the three-dimensional shaping apparatus 100 is displayed. The display portion 120 in this embodiment is constituted by a liquid crystal display. The operation portion 130 is constituted by a button for operating the three-dimensional shaping apparatus 100. The display portion 120 and the operation portion 130 may be constituted as one body by constituting the display portion 120 by a touch panel.

In this embodiment, the reading portion 140 is provided below the operation panel 115 in the casing 110. In this embodiment, the reading portion 140 includes a camera and is configured to be able to read various information by analyzing an image captured by the camera. The reading portion 140 can, for example, capture an image of a two-dimensional code by the camera and read the two-dimensional code in the captured image.

The three-dimensional shaping apparatus 100 produces a three-dimensional shaped article having a desired shape by driving the moving mechanism 400 so as to change the relative position of the ejection unit 200 and the shaping stage 300 while ejecting the shaping material toward the shaping stage 300 from a nozzle 61 provided in the ejection unit 200 under the control of the controller 500, thereby stacking the shaping material on the shaping stage 300. A detailed configuration of the ejection unit 200 will be described later with reference to FIG. 2. The nozzle 61 is sometimes referred to as "ejection portion".

The shaping stage 300 has a shaping face 310 opposed to the nozzle 61. On the shaping face 310, the shaping material ejected from the nozzle 61 is stacked. In this embodiment, the shaping stage 300 is supported by the moving mechanism 400.

The moving mechanism 400 changes the relative position of the ejection unit 200 and the shaping stage 300. In this embodiment, the moving mechanism 400 moves the shaping stage 300 with respect to the ejection unit 200. The moving mechanism 400 in this embodiment is constituted by a three-axis positioner for moving the shaping stage 300 in three axis directions of the X, Y, and Z directions by driving forces of three motors. Each motor drives under the control of the controller 500. The moving mechanism 400 may not be configured to move the shaping stage 300, but may be configured to move the ejection unit 200 without moving the shaping stage 300. The moving mechanism 400 may be configured to move both the ejection unit 200 and the shaping stage 300.

The controller 500 is constituted by a computer including one or more processors, a main storage device, and an input/output interface for performing signal input/output to/from the outside. In this embodiment, the controller 500 exhibits various functions by execution of a program or a command read on the main storage device by the processor. The controller 500 may not be constituted by a computer, but may be constituted by a combination of a plurality of circuits.

The data processing portion 600 is constituted by a computer including one or more processors, a main storage device, and an input/output interface for performing signal input/output to/from the outside. In this embodiment, the data processing portion 600 exhibits various functions by execution of a program or a command read on the main storage device by the processor. The data processing portion 600 may be constituted as a part of the controller 500. A detailed configuration of the data processing portion 600 will be described later with reference to FIG. 5.

Figure 2:
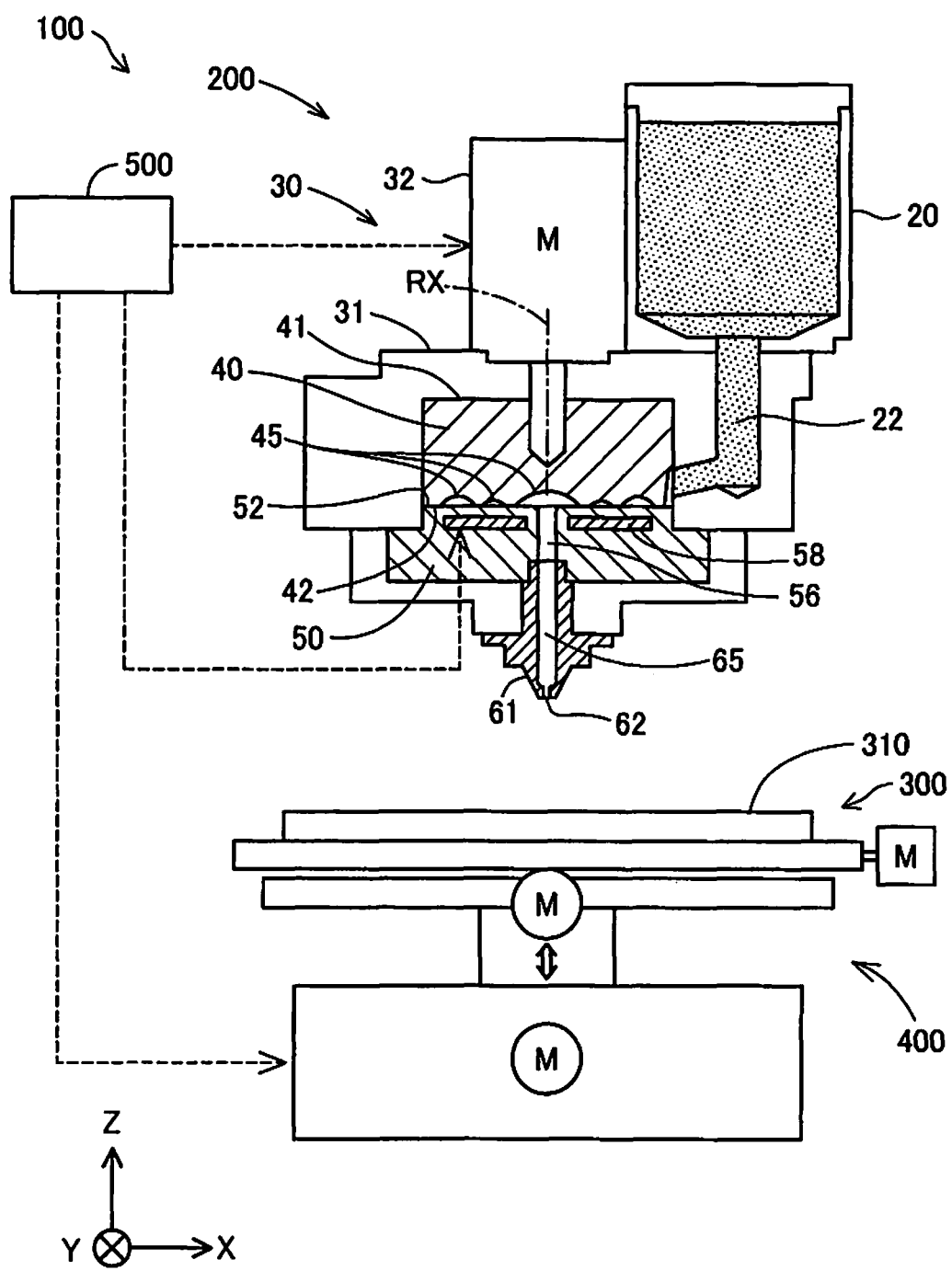
FIG. 2 is an explanatory view showing a schematic configuration of an ejection unit in the first embodiment.

FIG. 2 is an explanatory view showing a schematic configuration of the ejection unit 200 in this embodiment. The ejection unit 200 includes a material storage portion 20, a melting portion 30, and the nozzle 61. To the material storage portion 20, a material in a state of a pellet, a powder, or the like is fed. The material in this embodiment is an ABS resin in a pellet form. The material storage portion 20 in this embodiment is constituted by a hopper. The material storage portion 20 and the melting portion 30 are coupled to each other through a supply channel 22 provided below the material storage portion 20. The material fed to the material storage portion 20 is supplied to the melting portion 30 through the supply channel 22.

The melting portion 30 includes a screw case 31, a driving motor 32, a flat screw 40, and a barrel 50. The melting portion 30 melts at least a part of the material in a solid state supplied from the material storage portion 20 to form a shaping material in a paste form having fluidity, and supplies the shaping material to the nozzle 61. The flat screw 40 is sometimes simply referred to as "screw".

The screw case 31 houses the flat screw 40. To an upper face of the screw case 31, the driving motor 32 is fixed. A rotating shaft of the driving motor 32 is coupled to an upper face 41 of the flat screw 40.

The flat screw 40 has a substantially columnar shape whose height in a direction along a central axis RX is smaller than the diameter. The flat screw 40 is disposed in the screw case 31 so that the central axis RX becomes parallel to the Z direction. The flat screw 40 rotates around the central axis RX in the screw case 31 due to a torque generated by the driving motor 32.

The flat screw 40 has a groove formed face 42 at an opposite side to the upper face 41 in a direction along the central axis RX. In the groove formed face 42, a groove portion 45 is formed. A detailed shape of the groove formed face 42 of the flat screw 40 will be described later with reference to FIG. 3.

The barrel 50 is provided below the flat screw 40. The barrel 50 has a screw counter face 52 opposed to the groove formed face 42 of the flat screw 40. The barrel 50 has a built-in heater 58 at a position opposed to the groove portion 45 of the flat screw 40. The temperature of the heater 58 is controlled by the controller 500. The heater 58 is sometimes referred to as "heating portion".

At the center of the screw counter face 52, a communication hole 56 is provided. The communication hole 56 communicates with the nozzle 61. A detailed shape of the screw counter face 52 of the barrel 50 will be described later with reference to FIG. 4.

The nozzle 61 is provided with a nozzle hole 62 and a nozzle channel 65 communicating with the nozzle hole 62. The nozzle hole 62 is provided at a tip portion of the nozzle 61. The nozzle hole 62 is a portion with a reduced channel cross section provided at an end portion at a side communicating with the atmosphere of the nozzle channel 65. The nozzle channel 65 communicates with the communication hole 56 of the melting portion 30. The forming material supplied to the nozzle 61 from the melting portion 30 is ejected from the nozzle hole 62.

Figure 3:
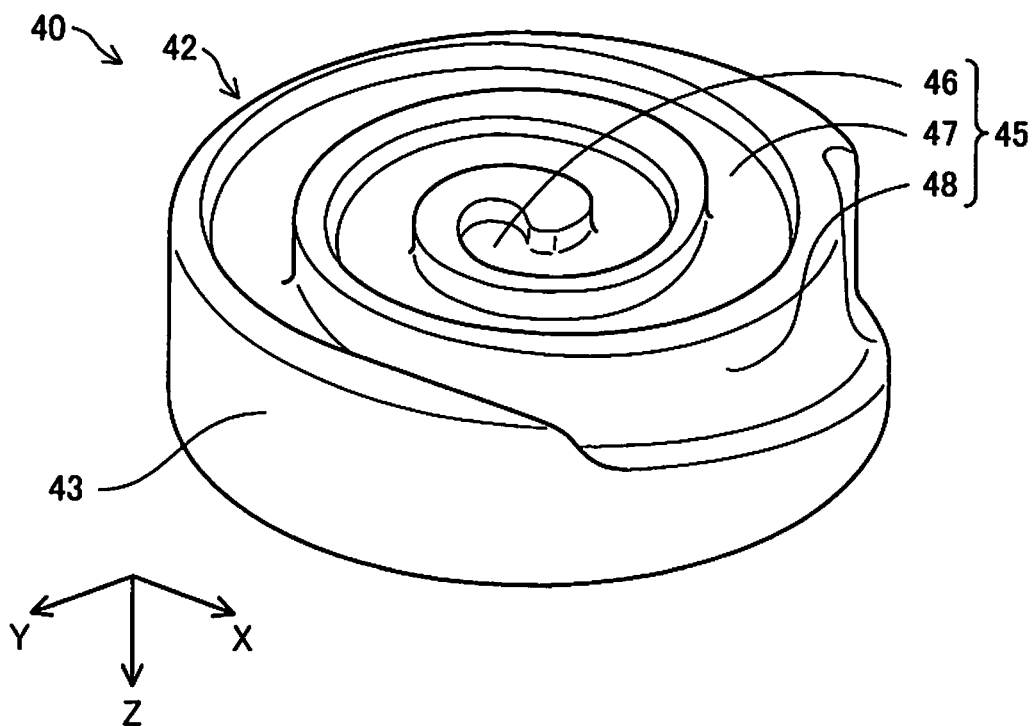
FIG. 3 is a perspective view showing a configuration of a groove formed face of a flat screw in the first embodiment.

FIG. 3 is a perspective view showing a configuration of the groove formed face 42 of the flat screw 40 in this embodiment. The flat screw 40 shown in FIG. 3 is shown in a state where the vertical positional relationship shown in FIG. 2 is reversed for facilitating the understanding of the technique. In the groove formed face 42 of the flat screw 40, the groove portion 45 is formed as described above. The groove portion 45 includes a central portion 46, a spiral portion 47, and a material introduction portion 48.

The central portion 46 is a circular recess formed around the central axis RX of the flat screw 40. The central portion 46 is opposed to the communication hole 56 provided in the barrel 50.

The spiral portion 47 is a groove extending in a spiral shape so as to draw an arc toward the outer circumference of the groove formed face 42 with the central portion 46 as the center. The spiral portion 47 may be configured to extend in an involute curve shape or in a helical shape. One end of the spiral portion 47 is coupled to the central portion 46. The other end of the spiral portion 47 is coupled to the material introduction portion 48.

The material introduction portion 48 is a groove wider than the spiral portion 47 provided at the outer circumference of the groove formed face 42. The material introduction portion 48 is continuous to a side face 43 of the flat screw 40. The material introduction portion 48 introduces the material supplied from the material storage portion 20 to the spiral portion 47 through the supply channel 22. In FIG. 3, a form in which a single streak of spiral portion 47 and a single streak of material introduction portion 48 are provided toward the outer circumference from the central portion 46 of the flat screw 40 is shown, however, a plurality of streaks of spiral portions 47 and a plurality of streaks of material introduction portions 48 may be provided toward the outer circumference from the central portion 46 of the flat screw 40.

Figure 4:
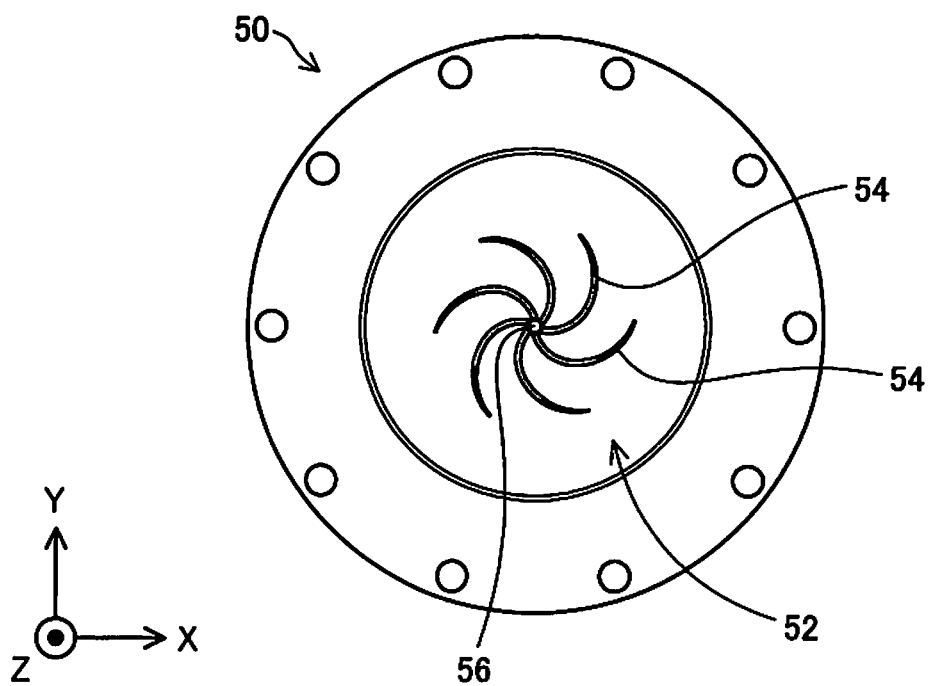
FIG. 4 is a top view showing a configuration of a screw counter face of a barrel in the first embodiment.

FIG. 4 is a top view showing a configuration of the screw counter face 52 of the barrel 50 in this embodiment. As described above, at the center of the screw counter face 52, the communication hole 56 communicating with the nozzle 61 is formed. Around the communication hole 56 in the screw counter face 52, a plurality of guide grooves 54 are formed. One end of each of the guide grooves 54 is coupled to the communication hole 56, and each guide groove 54 extends in a spiral shape toward the outer circumference of the screw counter face 52 from the communication hole 56. Each guide groove 54 has a function of guiding the shaping material to the communication hole 56.

According to the configuration of the ejection unit 200 described above, the material fed to the material storage portion 20 passes through the supply channel 22 and is supplied to the material introduction portion 48 from the side face 43 of the rotating flat screw 40. The material supplied into the material introduction portion 48 is conveyed into the spiral portion 47 by the rotation of the flat screw 40.

At least a part of the material conveyed into the spiral portion 47 is melted by the rotation of the flat screw 40 and heating by the built-in heater 58 in the barrel 50 to become the shaping material in a paste form having fluidity.

By the rotation of the flat screw 40, the shaping material is conveyed to the central portion 46 in the spiral portion 47. The shaping material conveyed to the central portion 46 is sent out to the nozzle hole 62 through the nozzle channel 65 from the communication hole 56, and ejected to the shaping stage 300 from the nozzle hole 62. In this manner, the shaping material is stacked on the shaping stage 300, whereby a three-dimensional shaped article is produced.

Figure 5:
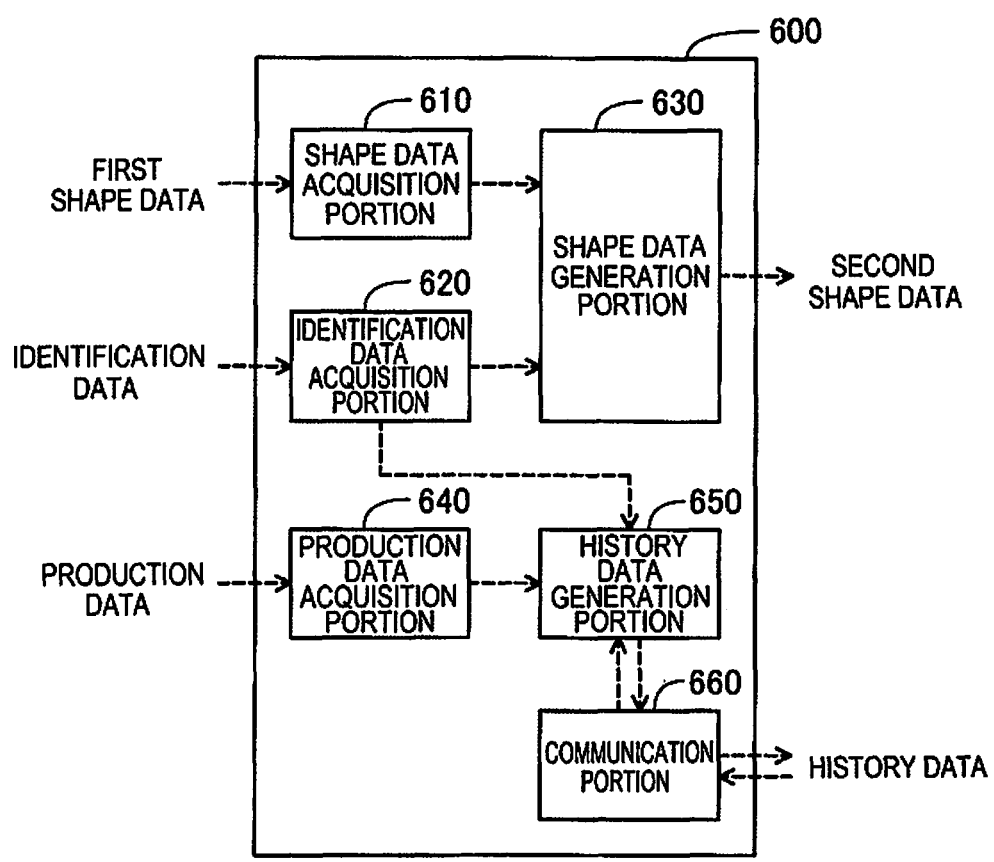
FIG. 5 is a block diagram showing a schematic configuration of a data processing portion in the first embodiment.

FIG. 5 is a block diagram showing a schematic configuration of the data processing portion 600. The data processing portion 600 includes a shape data acquisition portion 610, an identification data acquisition portion 620, a shape data generation portion 630, a production data acquisition portion 640, a history data generation portion 650, and a communication portion 660. The shape data acquisition portion 610 acquires first shape data representing a shape of a three-dimensional shaped article. The identification data acquisition portion 620 acquires identification data representing identification information for identifying one three-dimensional shaped article from a plurality of three-dimensional shaped articles produced. The identification information refers to, for example, a serial number or a lot number of the three-dimensional shaped article. The shape data generation portion 630 generates second shape data representing the shape of the three-dimensional shaped article including the shape representing the identification information using the first shape data acquired through the shape data acquisition portion 610, and the identification data acquired through the identification data acquisition portion 620.

The production data acquisition portion 640 acquires production data representing production information of the produced three-dimensional shaped article. The production information is information representing the production date or the production site of the three-dimensional shaped article, a material used in the production, the name of the manufacturer of the material used in the production, the temperature of the heater 58 during the production, the generation of the produced three-dimensional shaped article, etc. The generation of the three-dimensional shaped article will be described later with reference to FIG. 8. When a recycled material is included in the material used in the production, the production information includes the weight ratio of the recycled material included in the material, the recycling frequency of the recycled material, the serial number of an already used three-dimensional shaped article that is a raw material of the recycled material, etc. The three-dimensional shaped article used as a raw material of the recycled material is sometimes referred to as "recycled three-dimensional shaped article".

The history data generation portion 650 generates history data representing identification information and production information using the identification data acquired through the identification data acquisition portion 620 and the production data acquired through the production data acquisition portion 640. The communication portion 660 transmits the generated history data to the server 700. The transmitted history data are managed by the server 700. The communication portion 660 can also acquire the history data managed by the server 700. In the history data that can be acquired by the communication portion 660, history data of the three-dimensional shaped article produced in the past are also included.

FIG. 6 is an explanatory view showing one example of the history data managed by the server 700. In the history data for each serial number managed by the server 700, production information regarding the production date, the production site, the generation of the three-dimensional shaped article, the material used in the production, etc. is shown. When a recycled material is included in the material used in the production, the history data of the already used three-dimensional shaped article used as a raw material of the recycled material is associated. In FIG. 6, for example, in the history data regarding the three-dimensional shaped article with a serial number "ABC12345", the production date, the production site, the material used in the production, being a three-dimensional shaped article of the first generation, etc. are shown. The three-dimensional shaped article with a serial number "ABC12345" is a three-dimensional shaped article of the first generation, and therefore, a recycled material is not included in the material used in the production. Accordingly, in the history data regarding the three-dimensional shaped article with a serial number "ABC12345", the history data of an already used three-dimensional shaped article used as a raw material of a recycled material are not associated.

In the history data regarding the three-dimensional shaped article with a serial number "ABC23456", the production date, the production site, the material used in the production, being a three-dimensional shaped article of the second generation, etc. are shown. The three-dimensional shaped article with a serial number "ABC23456" is a three-dimensional shaped article of the second generation, and therefore, a recycled material is included in the material used in the production. Accordingly, in the history data regarding the three-dimensional shaped article with a serial number "ABC23456", the history data of the three-dimensional shaped article with a serial number "ABC12345" and the history data of the three-dimensional shaped article with a serial number "ABC12346", each of which is an already used three-dimensional shaped article used as a raw material of the recycled material, are associated. In this embodiment, under the history data of the three-dimensional shaped article with a serial number "ABC23456", the history data of the three-dimensional shaped article with a serial number "ABC12345" and the history data of the three-dimensional shaped article with a serial number "ABC12346" are shown by a tree structure.

In the history data regarding the three-dimensional shaped article with a serial number "ABC34567", the production date, the production site, the material used in the production, being a three-dimensional shaped article of the third generation, etc. are shown. In the history data regarding the three-dimensional shaped article with a serial number "ABC34567", the history data of the three-dimensional shaped article with a serial number "ABC23456" and the history data of a three-dimensional shaped article with a serial number "ABC23999, each of which was used as a raw material of the recycled material, are associated. The three-dimensional shaped article with a serial number "ABC23456" is a three-dimensional shaped article of the second generation, and therefore, in the history data thereof, the history data of the three-dimensional shaped article with a serial number "ABC12345" and the history data of the three-dimensional shaped article with a serial number "ABC12346", each of which was used in the production thereof, are further associated.

Figure 7:
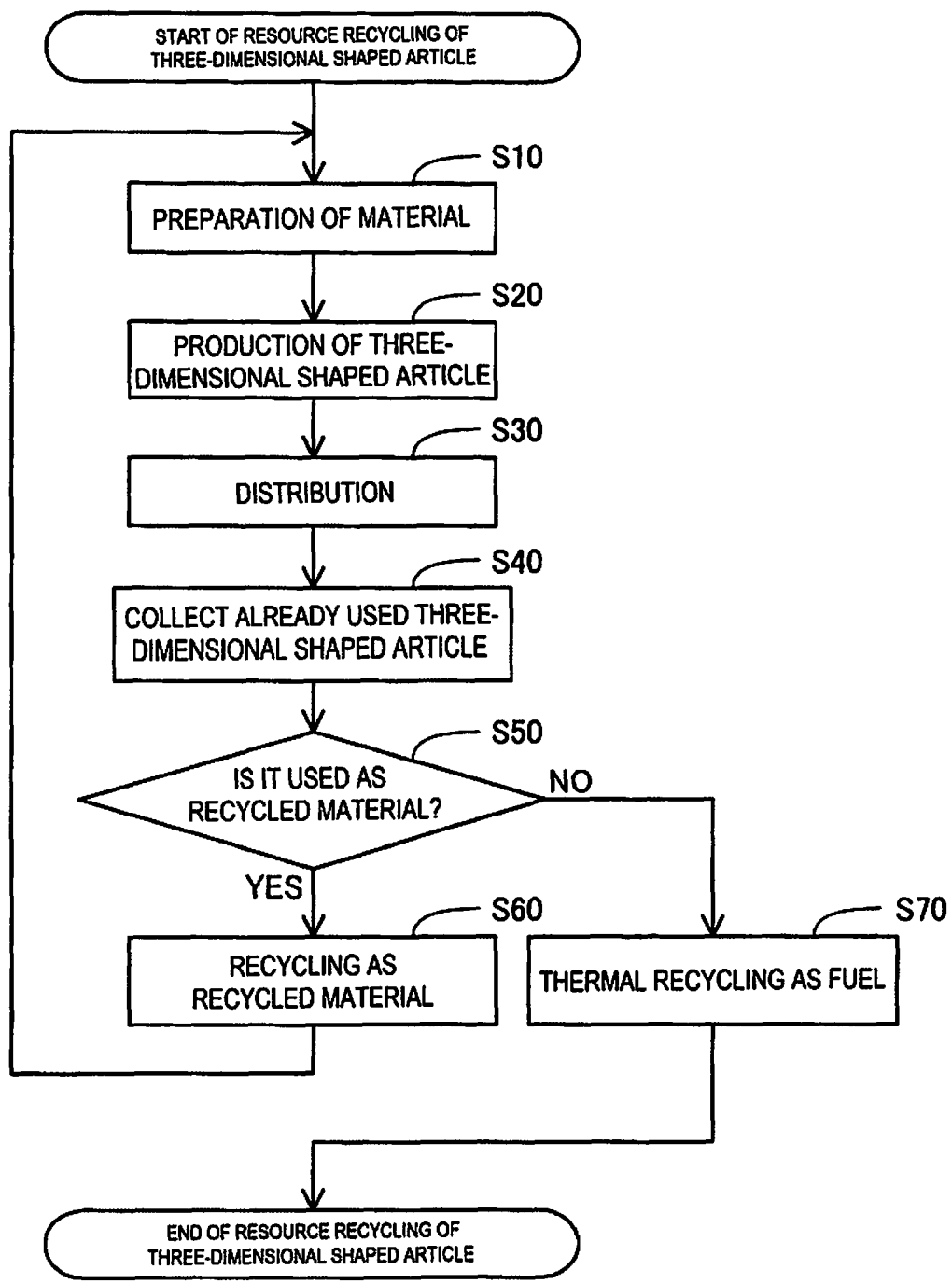
FIG. 7 is a flowchart showing one example of a step of recycling a three-dimensional shaped article as a resource.

FIG. 7 is a flowchart showing one example of a step of recycling a three-dimensional shaped article as a resource. This step is managed by a manufacturer of the three-dimensional shaped article or the like. First, in Step S10, by the manufacturer or the like, a material of the three-dimensional shaped article is prepared. In the prepared material, a recycled material may be included. Subsequently, in Step S20, a three-dimensional shaped article is produced by using the prepared material. In Step S30, the produced three-dimensional shaped article is shipped out, distributed in a market, and passed into the hands of a consumer or the like.

In Step S40, an already used three-dimensional shaped article discarded by a consumer or the like is collected by the manufacturer or the like. In Step S50, the manufacturer or the like determines whether the collected already used three-dimensional shaped article is used as a recycled material. As the recycling frequency that is the number of times the three-dimensional shaped article was used as a recycled material increases, the content of impurities in the recycled material increases. Therefore, for example, when the recycling frequency of the recycled material used in the production of the already used three-dimensional shaped article is less than a predetermined frequency, it is determined that the already used three-dimensional shaped article is used as a recycled material.

When it is determined that the already used three-dimensional shaped article is used as a recycled material in Step S50, in Step S60, the already used three-dimensional shaped article is formed into a recycled material through grinding, removal of foreign substances, etc. by the manufacturer or the like. Thereafter, going back to Step S10, the already used three-dimensional shaped article formed into the recycled material is recycled as a material of a new three-dimensional shaped article. The already used three-dimensional shaped article may be reused as a three-dimensional shaped article without being recycled as a recycled material. The recycling is sometimes referred to as "material recycling".

On the other hand, when it is not determined that the already used three-dimensional shaped article is used as a recycled material in Step S50, in Step S70, the already used three-dimensional shaped article is thermally recycled as fuel. That is, from the already used three-dimensional shaped article, thermal energy generated during incineration is recovered and used. By thermally recycling the already used three-dimensional shaped article, the step of recycling the three-dimensional shaped article as a resource is completed. When the already used three-dimensional shaped article cannot be thermally recycled, the already used three-dimensional shaped article may be disposed of by burying or the like.

Figure 8:
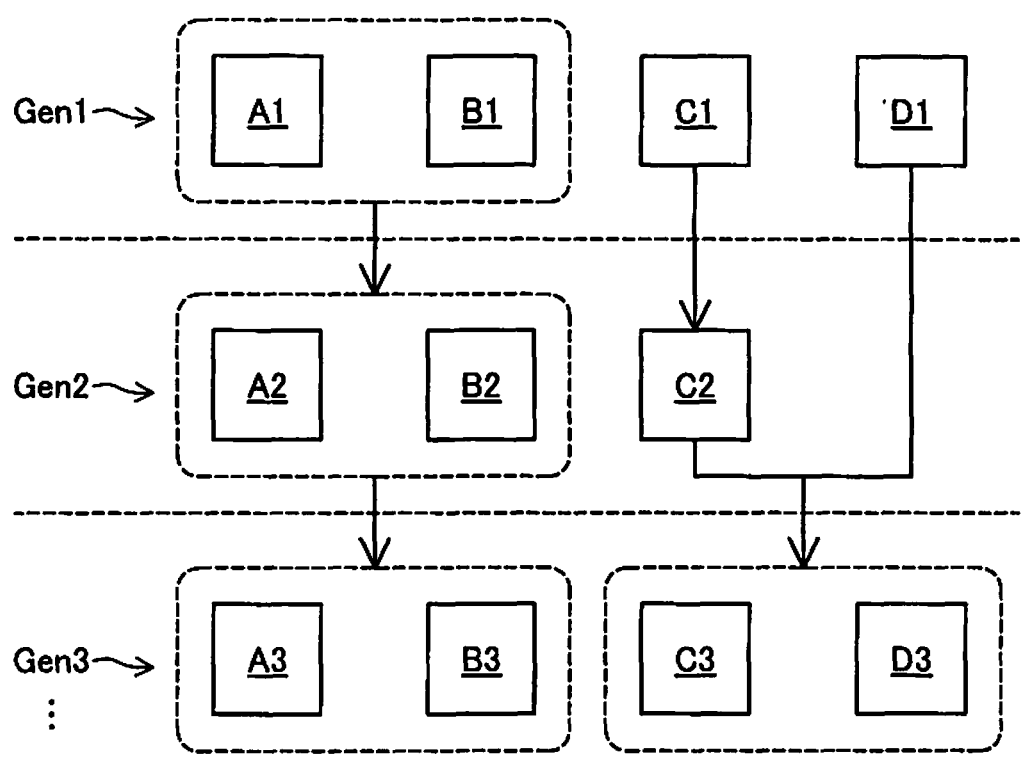
FIG. 8 is an explanatory view showing generation of the three-dimensional shaped article.

FIG. 8 is an explanatory view showing the generation of the three-dimensional shaped article. A three-dimensional shaped article produced using a new material is referred to as "three-dimensional shaped article of the first generation Gen1". A three-dimensional shaped article produced using a material including a recycled material using a three-dimensional shaped article of the first generation Gen1 as a raw material is referred to as "three-dimensional shaped article of the second generation Gen2". A three-dimensional shaped article produced using a material including a recycled material using a three-dimensional shaped article of the second generation Gen2 as a raw material is referred to as "three-dimensional shaped article of the third generation Gen3".

Product A1, Product B1, Product C1, and Product D1 are three-dimensional shaped articles produced using a new material. Therefore, Product A1, Product B1, Product C1, and Product D1 each correspond to a three-dimensional shaped article of the first generation Gen1.

Product A2 and Product B2 are three-dimensional shaped articles produced using a recycled material including Product A1 and Product B1, each of which is a three-dimensional shaped article of the first generation Gen1, as a raw material. Therefore, Product A2 and Product B2 each correspond to a three-dimensional shaped article of the second generation Gen2. Product C2 is a three-dimensional shaped article produced using a recycled material including Product C1 that is a three-dimensional shaped article of the first generation Gen1 as a raw material. Therefore, Product C2 corresponds to a three-dimensional shaped article of the second generation Gen2.

Product A3 and Product B3 are three-dimensional shaped articles produced using a recycled material including Product A2 and Product B2, each of which is a three-dimensional shaped article of the second generation Gen2, as a raw material. Therefore, Product A3 and Product B3 each correspond to a three-dimensional shaped article of the third generation Gen3. Product C3 and Product D3 are three-dimensional shaped articles produced using a recycled material including Product C2 that is a three-dimensional shaped article of the second generation Gen2 as a raw material and using a recycled material including Product D1 that is a three-dimensional shaped article of the first generation Gen1 as a raw material. Therefore, Product C3 and Product D3 each correspond to a three-dimensional shaped article of the third generation Gen3.

Figure 9:
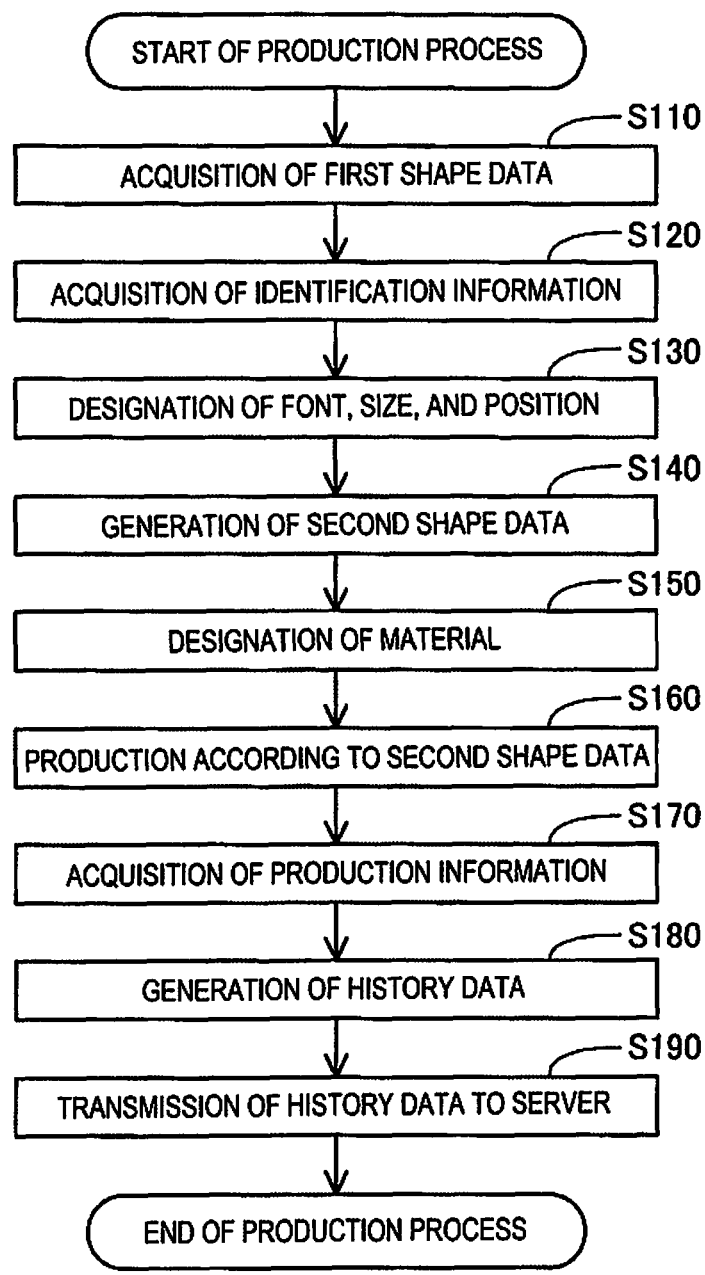
FIG. 9 is a flowchart showing contents of a production process in the first embodiment.

FIG. 9 is a flowchart showing contents of a production process for realizing the production of a three-dimensional shaped article OB in this embodiment. This process is executed when a predetermined start operation is performed by a user for the operation panel 115 provided in the three-dimensional shaping apparatus 100 or a computer coupled to the three-dimensional shaping apparatus 100.

First, in Step S110, the shape data acquisition portion 610 acquires first shape data for representing the shape of the three-dimensional shaped article. In this embodiment, the shape data acquisition portion 610 acquires first shaping path data PD1 as the first shape data. The first shaping path data PD1 are, for example, data representing the moving path of the nozzle 61 with respect to the shaping stage 300, the moving speed of the nozzle 61 with respect to the shaping stage 300, or the ejection amount of the shaping material from the nozzle 61. STL format or AMF format data for representing the shape of the three-dimensional shaped article are converted into the first shaping path data PD1 by a slicer. The shape data acquisition portion 610 acquires the first shaping path data PD1 from a computer coupled to the three-dimensional shaping apparatus 100 or a recording medium via an input/output interface. The acquired first shape data are transmitted to the shape data generation portion 630.

Subsequently, in Step S120, the identification data acquisition portion 620 acquires identification information for identifying the three-dimensional shaped article OB to be produced. In this embodiment, the identification data acquisition portion 620 acquires a serial number as the identification information. The identification data acquisition portion 620 acquires one serial number front a plurality of serial numbers stored in advance in a memory of the data processing portion 600 as the serial number to be given to the three-dimensional shaped article OB to be produced. The identification data acquisition portion 620 may acquire a serial number designated by a used via the operation panel 115.

Figure 10:
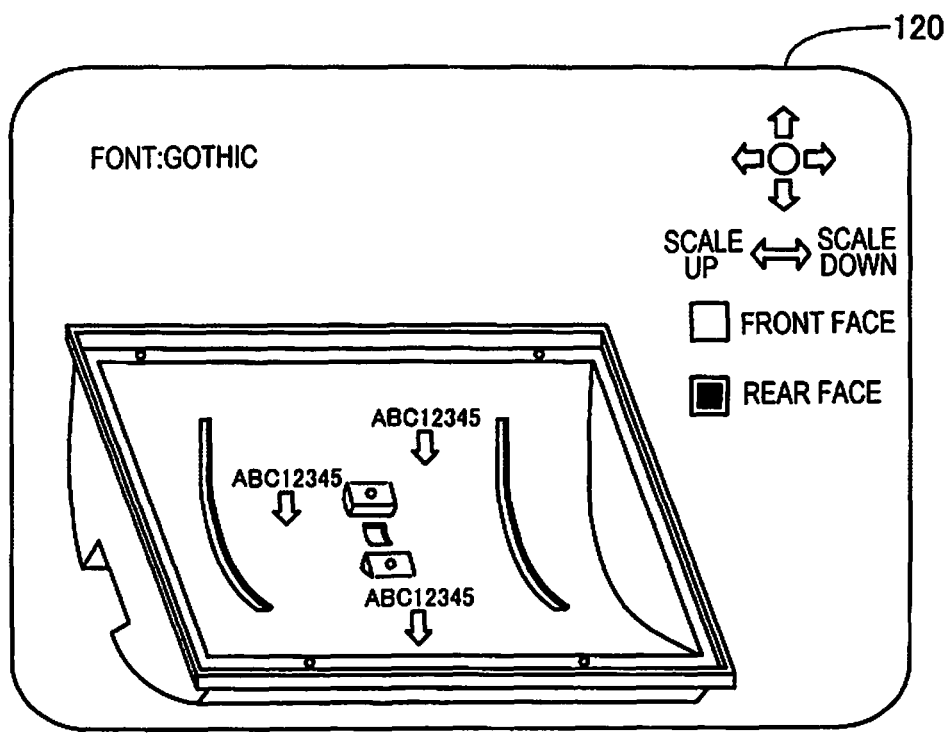
FIG. 10 is an explanatory view showing one example of an operation screen displayed in a display portion.

FIG. 10 is an explanatory view showing one example of an operation screen displayed in the display portion 120. With reference to FIGS. 9 and 10, in this embodiment, the identification information is represented by a letter or a symbol. This letter or symbol is shown by forming a part of the three-dimensional shaped article OB in a projecting shape. In this embodiment, in Step S130, by operating the operation portion 130 by a user while confirming the operation screen displayed in the display portion 120, the font and size of the letter or symbol, and the position where the letter or symbol is formed in the three-dimensional shaped article OB are designated. The identification data acquisition portion 620 acquires the font and size of the letter or symbol, and the position where the letter or symbol is formed in the three-dimensional shaped article OB designated by the user. In this embodiment, as the position where the letter or symbol is formed, a plurality of positions in the three-dimensional shaped article OB are designated. The information representing the font and size of the letter or symbol, and the position where the letter or symbol is formed in the three-dimensional shaped article OB is referred to as "identification data" together with the identification information acquired in Step S120. The identification data acquired by the identification data acquisition portion 620 are transmitted to the shape data generation portion 630.

Figure 11:
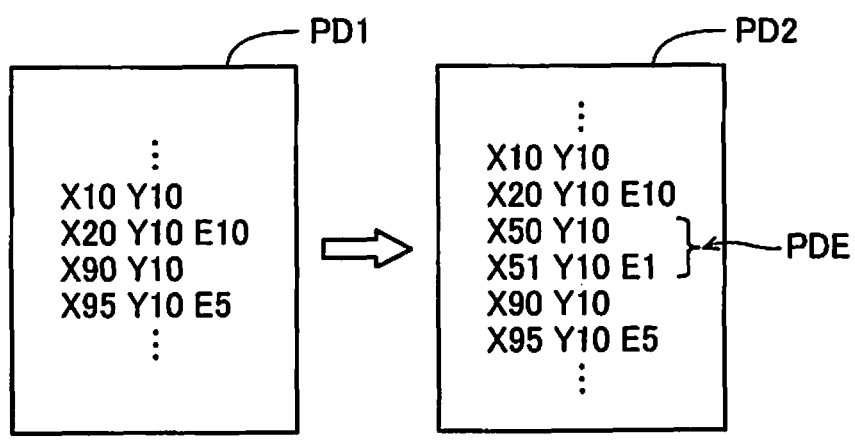
FIG. 11 is an explanatory view showing one example of first shape data and second shape data.

FIG. 11 is an explanatory view showing one example of the first shape data and the second shape data. With reference to FIGS. 9 and 11, in Step S140, the shape data generation portion 630 generates the second shape data for representing the shape of the three-dimensional shaped article OB including the shape representing the identification information using the first shape data and the identification data. In this embodiment, the shape data generation portion 630 first generates an identification information shaping path element PDE for forming the shape representing the identification information at a designated position in the three-dimensional shaped article OB using the identification data. Subsequently, the shape data generation portion 630 generates second shaping path data PD2 as the second shape data by adding the identification information shaping path element PDE to the first shaping path data PD1.

With reference to FIG. 9, in Step S150, a material to be used in the production of the three-dimensional shaped article OB is designated. When a recycled material is included in the material to be used in the production of the three-dimensional shaped article OB, the identification information of the already used three-dimensional shaped article used as a raw material of the recycled material is designated together with the type of the material. In this embodiment, a two-dimensional code representing the type of the material is provided in a package of the material, and by reading the two-dimensional code by the reading portion 140, the type of the material is designated. In the package of the material including the recycled material, the two-dimensional code representing information regarding the identification information of the already used three-dimensional shaped article used as a raw material of the recycled material together with the type of the material is provided, and by reading the two-dimensional code by the reading portion 140, the identification information of the already used three-dimensional shaped article used as a raw material of the recycled material is designated together with the type of the material. The material to be used in the production of the three-dimensional shaped article OB or the identification information of the already used three-dimensional shaped article used as a raw material of the recycled material may be designated by operating the operation panel 115 by the user. In addition, when the material is designated, for example, the temperature of the heater 58 or the like may be designated.

Figure 12:
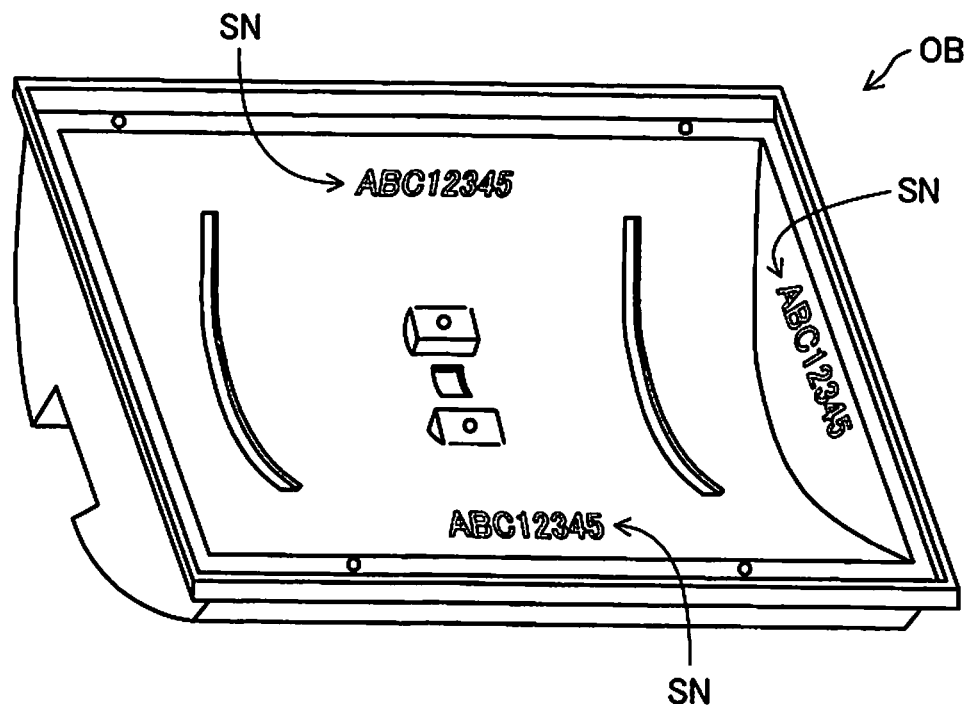
FIG. 12 is an explanatory view showing a three-dimensional shaped article produced according to the second shape data.

FIG. 12 is an explanatory view showing the three-dimensional shaped article OB produced according to the second shape data. With reference to FIGS. 9 and 12, in Step S160, the controller 500 controls the ejection unit 200 and the moving mechanism 400 according to the second shaping path data PD2, thereby producing the three-dimensional shaped article OB having the shape SN representing the identification information at a plurality of sites. In this embodiment, by producing the three-dimensional shaped article OB according to the second shaping path data PD2 in which the identification information shaping path element PDE is added to the first shaping path data PD1, the shape SN representing the identification information is formed in a projecting shape at a face of the three-dimensional shaped article OB. The projecting shape means a state where the shape SN representing the identification information projects above the peripheral face in the three-dimensional shaped article OB so that the volume of the three-dimensional shaped article OB represented by the second shape data becomes larger than the volume of the three-dimensional shaped article represented by the first shape data.

With reference to FIG. 9, in Step S170, the production data acquisition portion 640 acquires the production information of the three-dimensional shaped article OB produced in Step S160. When the three-dimensional shaped article OB is produced using a material including a recycled material, the production information acquired by the production data acquisition portion 640 includes the identification information of the three-dimensional shaped article used as a raw material of the recycled material. In Step S180, the history data generation portion 650 generates history data using the identification information and the production information of the three-dimensional shaped article OB. In Step S190, the history data generation portion 650 transmits the generated history data to the server 700 via the communication portion 660. The transmitted history data are managed by the server 700.

According to the three-dimensional shaping system 10 of this embodiment described above, the three-dimensional shaped article OB including the shape SN representing the identification information is produced, and the history data representing the identification information and the production information of the three-dimensional shaped article OB are transmitted to the server 700. Therefore, by using the identification information shown in the produced three-dimensional shaped article OB, the history data of the three-dimensional shaped article OB managed by the server 700 can be identified. Accordingly, the production information when shaping the three-dimensional shaped article OB can be identified from the three-dimensional shaped article OB.

Further, in this embodiment, when a recycled material is included in the material used in the production of the three-dimensional shaped article OB, the identification information of the already used three-dimensional shaped article used as a raw material of the recycled material is included in the history data transmitted to the server 700. Therefore, the history data regarding the already used three-dimensional shaped article used as a raw material of the recycled material used in the production can be identified accompanying the history data regarding the produced three-dimensional shaped article OB. Accordingly, a more detailed production condition when producing the three-dimensional shaped article OB can be identified from the three-dimensional shaped article OB.

Further, in this embodiment, the shape data generation portion 630 generates the second shape data for representing the shape of the three-dimensional shaped article OB having the shape SN representing the identification information at a plurality of sites, and therefore, the three-dimensional shaped article OB having the shape SN representing the identification information at a plurality of sites is produced. Accordingly, even if the three-dimensional shaped article OB is in a broken state when it is collected, failure in reading the identification information can be suppressed.

In this embodiment, an ABS resin material in a pellet form is used, however, as the material used in the ejection unit 200, for example, a material producing a three-dimensional shaped article using any of various materials such as a material having thermoplasticity, a metal material, or a ceramic material as a main material can also be adopted. Here, the "main material" refers to a material mainly used for forming the shape of the three-dimensional shaped article and means a material whose content is 50 wt % or more in the three-dimensional shaped article. In the above-mentioned shaping material, a material obtained by melting such a main material singly, or a material in a paste form obtained by melting a part of the components contained together with the main material is included.

When a material having thermoplasticity is used as the main material, the shaping material is formed by plasticization of the material in the melting portion 30. The "plasticization" refers to melting by applying heat to the material having thermoplasticity.

As the material having thermoplasticity, for example, any one or a combination of two or more of the following thermoplastic resin materials can be used.

Examples of Thermoplastic Resin Material general-purpose engineering plastics such as a polypropylene resin (PP), a polyethylene resin (PE), a polyacetal resin (POM), a polyvinyl chloride resin (PVC), a polyamide resin (PA), an acrylonitrile-butadiene-styrene resin (ABS), a polylactic acid resin (PLA), a polyphenylene sulfide resin (PPS), polyether ether ketone (PEEK), polycarbonate (PC), modified polyphenylene ether, polybutylene terephthalate, and polyethylene terephthalate, and engineering plastics such as polysulfone, polyethersulfone, polyphenylene sulfide, polyarylate, polyimide, polyamideimide, polyetherimide, and polyether ether ketone In the material having thermoplasticity, a pigment, a metal, a ceramic, or other than these, an additive such as a wax, a flame retardant, an antioxidant, or a heat stabilizer, or the like may be mixed. The material having thermoplasticity is converted into a molten state by plasticization due to the rotation of the flat screw 40 and heating by the heater 58 in the melting portion 30. The shaping material formed in this manner is cured by decreasing the temperature after being ejected from the nozzle hole 62.

The material having thermoplasticity is desirably injected from the nozzle hole 62 in a completely molten state by being heated to a temperature not lower than the glass transition point thereof. For example, an ABS resin has a glass transition point of about 120° C. and the temperature thereof when it is injected from the nozzle hole 62 is desirably about 200° C. In order to inject the shaping material in a high temperature state in this manner, a heater may be provided around the nozzle hole 62.

In the ejection unit 200, in place of the above-mentioned material having thermoplasticity, for example, the following metal material may be used as the main material. In this case, it is desirable that a component melting when forming the shaping material is mixed in a powder material obtained by pulverizing the following metal material, and the resulting material is fed to the melting portion 30.

Examples of Metal Material single metals such as magnesium (Mg), iron (Fe), cobalt (Co), chromium (Cr), aluminum (Al), titanium (Ti), copper (Cu), and nickel (Ni), or alloys containing one or more of these metals Examples of Alloy a maraging steel, stainless steel, cobalt-chromium-molybdenum, a titanium alloy, a nickel alloy, an aluminum alloy, a cobalt alloy, and a cobalt-chromium alloy In the ejection unit 200, in place of the above-mentioned metal material, a ceramic material can be used as the main material. As the ceramic material, for example, an oxide ceramic such as silicon dioxide, titanium dioxide, aluminum oxide, or zirconium oxide, a non-oxide ceramic such as aluminum nitride, or the like can be used. When a metal material or a ceramic material as described above is used as the main material, the shaping material placed in the shaping stage 300 may be cured by, for example, irradiation with a laser or sintering with hot air or the like.

The powder material of the metal material or the ceramic material to be fed to the material storage portion 20 may be a mixed material obtained by mixing a plurality of types of single metal powders or alloy powders or ceramic material powders. Further, the powder material of the metal material or the ceramic material may be coated with, for example, a thermoplastic resin as exemplified above or a thermoplastic resin other than those exemplified above. In this case, the material may be configured to exhibit fluidity by melting the thermoplastic resin in the melting portion 30.

To the powder material of the metal material or the ceramic material to be fed to the material storage portion 20, for example, a solvent as described below can also be added. As the solvent, one type or a combination of two or more types selected from the following solvents can be used.

Examples of Solvent water, (poly)alkylene glycol monoalkyl ethers such as ethylene glycol monomethyl ether, ethylene glycol monoethyl ether, propylene glycol monomethyl ether, and propylene glycol monoethyl ether, acetate esters such as ethyl acetate, n-propyl acetate, iso-propyl acetate, n-butyl acetate, and iso-butyl acetate, aromatic hydrocarbons such as benzene, toluene, and xylene, ketones such as methyl ethyl ketone, acetone, methyl isobutyl ketone, ethyl n-butyl ketone, diisopropyl ketone, and acetyl acetone, alcohols such as ethanol, propanol, and butanol, tetra-alkyl ammonium acetates, sulfoxide-based solvents such as dimethyl sulfoxide and diethyl sulfoxide, pyridine-based solvents such as pyridine, y-picoline, and 2,6-lutidine, tetra-alkyl ammonium acetates (for example, tetra-butyl ammonium acetate, etc.), ionic liquids such as butyl carbitol acetate, and the like In addition thereto, for example, a binder as described below can also be added to the powder material of the metal material or the ceramic material to be fed to the material storage portion 20.

Figure 13:
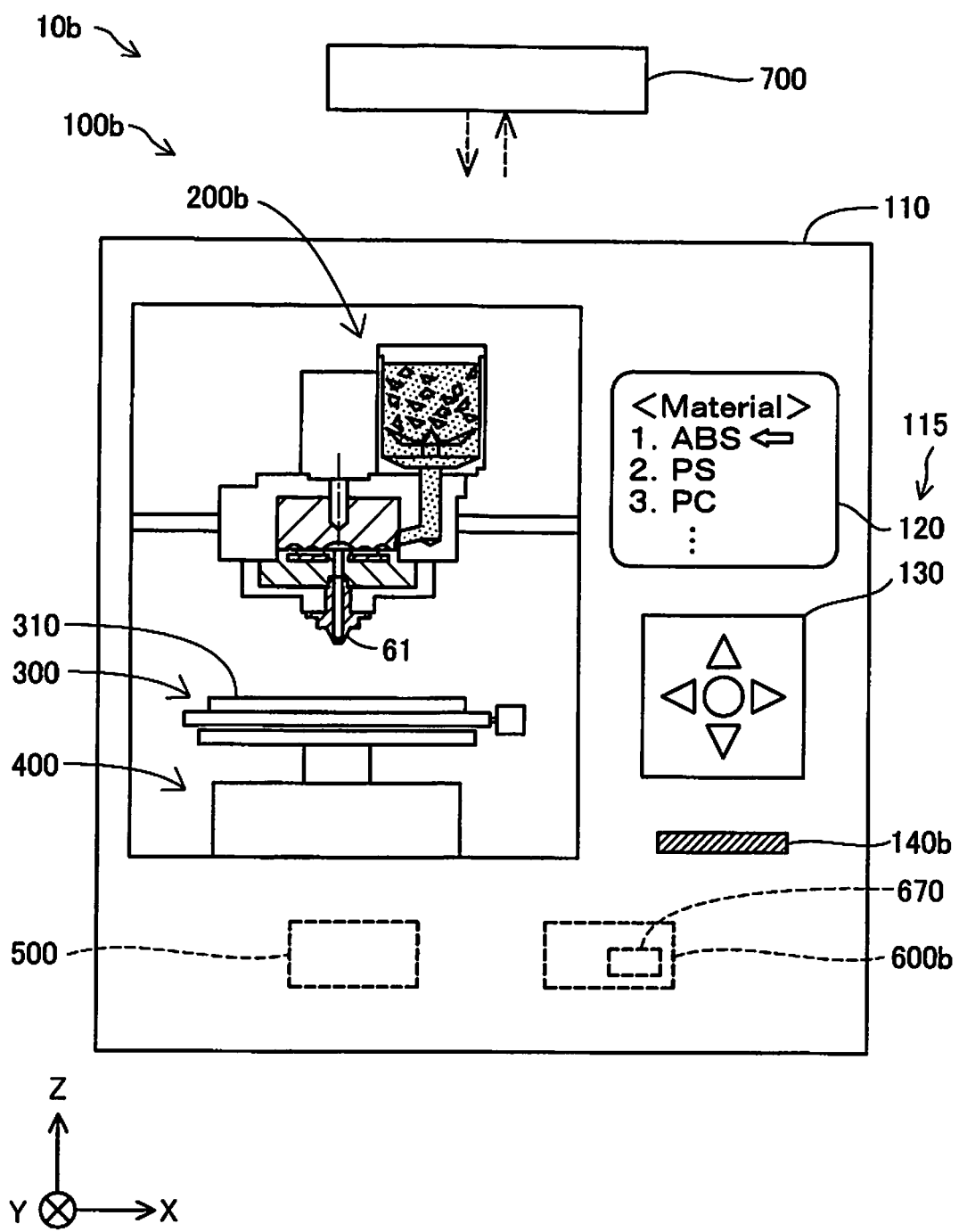
FIG. 13 is an explanatory view showing a schematic configuration of a three-dimensional shaping system in a second embodiment.
Figure 14:
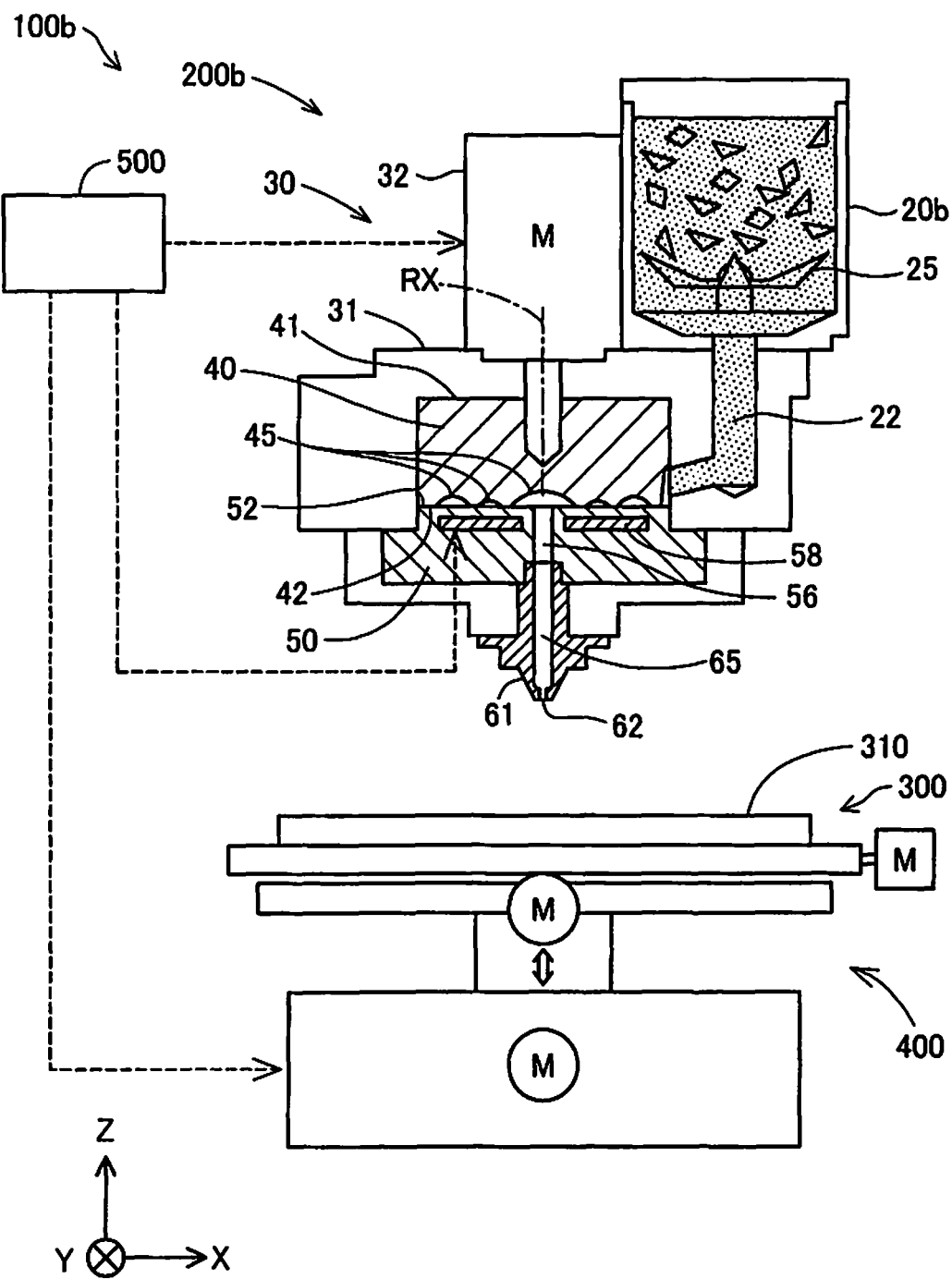
FIG. 14 is an explanatory view showing a schematic configuration of an ejection unit in the second embodiment.

Examples of Binder an acrylic resin, an epoxy resin, a silicone resin, a cellulosic resin, or another synthetic resin, or PLA (polylactic acid), PA (polyimide), PPS (polyphenylene sulfide), PEEK (polyether ether ketone), or other thermoplastic resins B. Second Embodiment FIG. 13 is an explanatory view showing a schematic configuration of a three-dimensional shaping system 10b in a second embodiment. FIG. 14 is an explanatory view showing a schematic configuration of an ejection unit 200b in the second embodiment. The three-dimensional shaping system 10b of the second embodiment is different from that of the first embodiment in that a determination portion 670 determining whether an already used three-dimensional shaped article is used as a recycled material, and a grinding portion 25 grinding the already used three-dimensional shaped article to form a recycled material are provided in a three-dimensional shaping apparatus 100b. Further, the contents of a production process for producing a three-dimensional shaped article OB are different from those of the first embodiment. The other configuration is the same as that of the first embodiment shown in FIG. 1 unless otherwise described.

In this embodiment, the determination portion 670 is provided in a data processing portion 600b. The determination portion 670 determines whether an already used three-dimensional shaped article is ground by the grinding portion 25 to form a recycled material. The determination portion 670 is configured to be able to acquire identification information of the already used three-dimensional shaped article acquired by a reading portion 140b. The determination portion 670 is configured to be able to communicate with a server 700 via a communication portion 660.

In this embodiment, the grinding portion 25 is configured as a blade including a plurality of hard and sharp edges provided in a material storage portion 20b. This blade rotates in the material storage portion 20b by a motor driving under the control of a controller 500. For example, when an already used three-dimensional shaped article is fed to the material storage portion 20b, the already used three-dimensional shaped article is ground by the rotating blade. The ground already used three-dimensional shaped article is supplied to a melting portion 30 as a recycled material.

In this embodiment, the reading portion 140b is configured to be able to read the identification information of the already used three-dimensional shaped article by capturing an image of a shape representing the identification information provided in the already used three-dimensional shaped article with a camera and analyzing the captured image.

Figure 15:
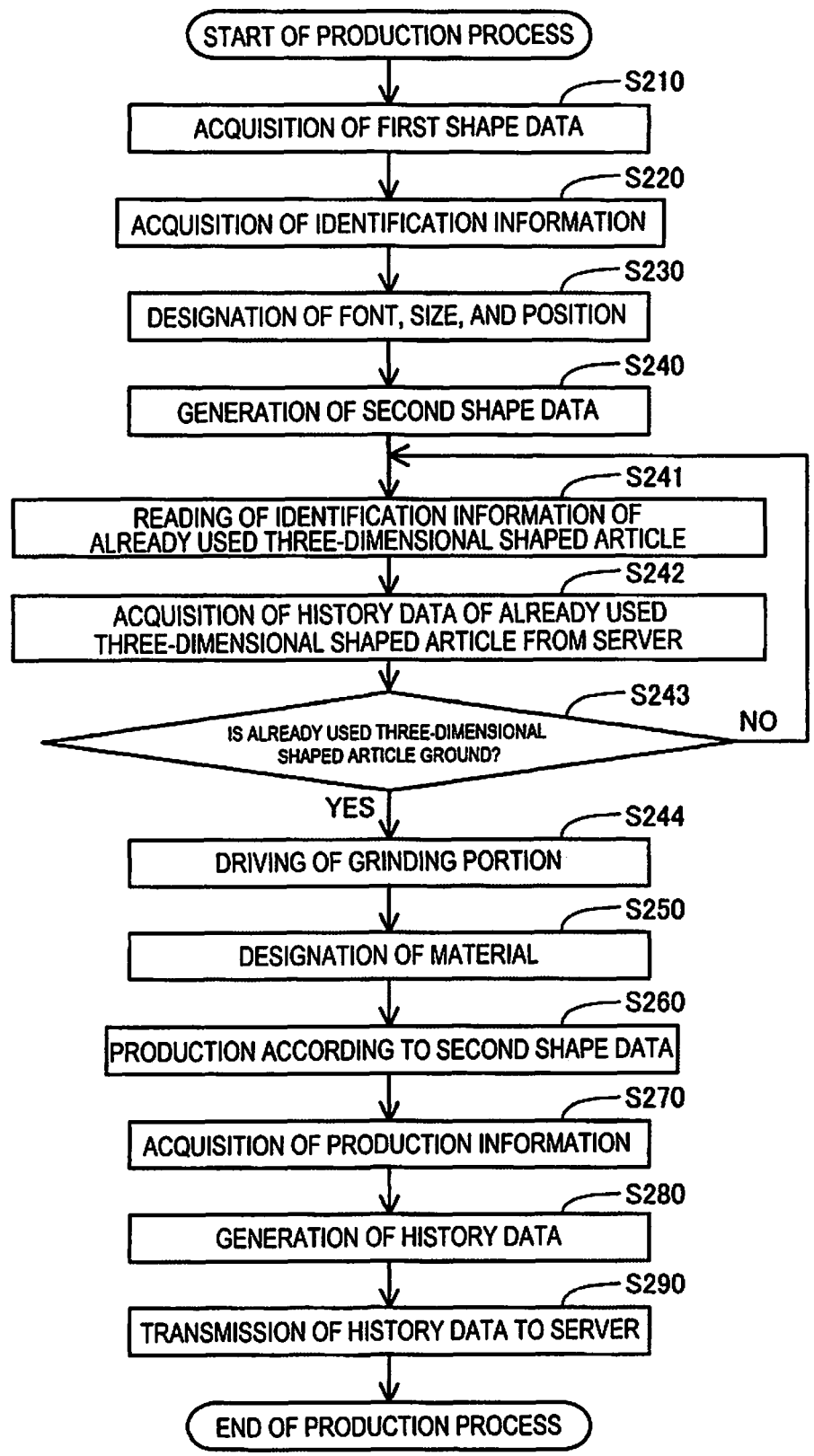
FIG. 15 is a flowchart showing contents of a production process in the second embodiment.

FIG. 15 is a flowchart showing contents of a production process for realizing the production of the three-dimensional shaped article OB in this embodiment. This process is executed when a predetermined start operation is performed by a user for an operation panel 115 provided in the three-dimensional shaping apparatus 100b or a computer coupled to the three-dimensional shaping apparatus 100b. In this embodiment, this process is executed when a mode in which an already used three-dimensional shaped article is ground and used as a recycled material is selected by operating the operation manel 115 by a user. When a mode in which a new material in a pellet form or a recycled material in a pellet form is used is selected by operating the operation manel 115 by a user, the same production process as the production process of the first embodiment described with reference to FIG. 9 is executed.

The contents of the process from Step S210 to Step S240 are the same as the contents of the process from Step S110 to Step S140 in the first embodiment described with reference to FIG. 9, and therefore, a description thereof will be omitted.

In Step S241, the shape representing the identification information provided in the already used three-dimensional shaped article is read by the reading portion 140b. In this embodiment, a user holds the already used three-dimensional shaped article up over the reading portion 140b so as to make the reading portion 140b read the shape representing the identification information.

In Step S242, the determination portion 670 acquires history data representing the identification information and the production information of the already used three-dimensional shaped article from the server 700 via the communication portion 660 using the identification information acquired by the reading portion 140b.

In Step S243, the determination portion 670 determines whether the already used three-dimensional shaped article is ground by the grinding portion 25 to form a recycled material using the acquired history data. The determination portion 670 determines whether the already used three-dimensional shaped article is ground to form a recycled material based on the deterioration condition of the already used three-dimensional shaped article. The determination portion 670 determines that the already used three-dimensional shaped article is ground by the grinding portion 25 to form a recycled material, for example, when the already used three-dimensional shaped article is lower than the third generation.

When it is not determined that the already used three-dimensional shaped article is ground to form a recycled material in Step S243, the process is returned to Step S241.

In this case, the user prepares another already used three-dimensional shaped article and makes the reading portion 140b read the shape representing the identification information. If the user cannot prepare another already used three-dimensional shaped article, the user can also forcibly terminate the production process by operating the operation panel 115. In this case, a new three-dimensional shaped article OB can be produced by selecting a mode in which a new material in a pellet form or a recycled material in a pellet form is used is selected by operating the operation panel 115 by the user.

On the other hand, when it is determined that the already used three-dimensional shaped article is ground to form a recycled material in Step S243, driving of the grinding portion 25 is started in Step S244. By feeding the already used three-dimensional shaped article in which the shape representing the identification information was read by the reading portion 140b to the material storage portion 20b by the user, the already used three-dimensional shaped article is ground by the grinding portion 25 and is used in the production of a new three-dimensional shaped article OB as a recycled material.

In Step S250, the material of the three-dimensional shaped article OB to be newly produced is designated using the history data of the already used three-dimensional shaped article acquired in Step S242. For example, when the already used three-dimensional shaped article is made of an ABS resin, as the material of the three-dimensional shaped article OB to be newly produced, a recycled material of an ABS resin is designated.

In Step S260, the controller 500 controls the ejection unit 200 and the moving mechanism 400 according to the second shaping path data PD2, thereby producing the three-dimensional shaped article OB having a shape SN representing the identification information.

In Step S270, the production data acquisition portion 640 acquires the production information of the three-dimensional shaped article OB produced in Step S260. In this production information, the identification information of the already used three-dimensional shaped article used as a raw material of the recycled material is included.

In Step S280, the history data generation portion 650 generates history data of the newly produced three-dimensional shaped article OB using the identification information of the newly produced three-dimensional shaped article OB and the production information of the newly produced three-dimensional shaped article OB. In Step S290, the history data generation portion 650 transmits the generated history data to the server 700 via the communication portion 660. The transmitted history data are managed by the server 700.

According to the three-dimensional shaping system 10b of this embodiment described above, it is possible to determine whether an already used three-dimensional shaped article is formed into a recycled material using the history data of the already used three-dimensional shaped article managed by the server 700. Therefore, formation of a recycled material of low quality can be suppressed.

In particular, in this embodiment, the grinding portion 25 is provided in the material storage portion 20b, and therefore, even if the already used three-dimensional shaped article is not processed into a pellet form or the like, by grinding the already used three-dimensional shaped article by the grinding portion 25, the resulting material can be used as a recycled material.

Figure 16:
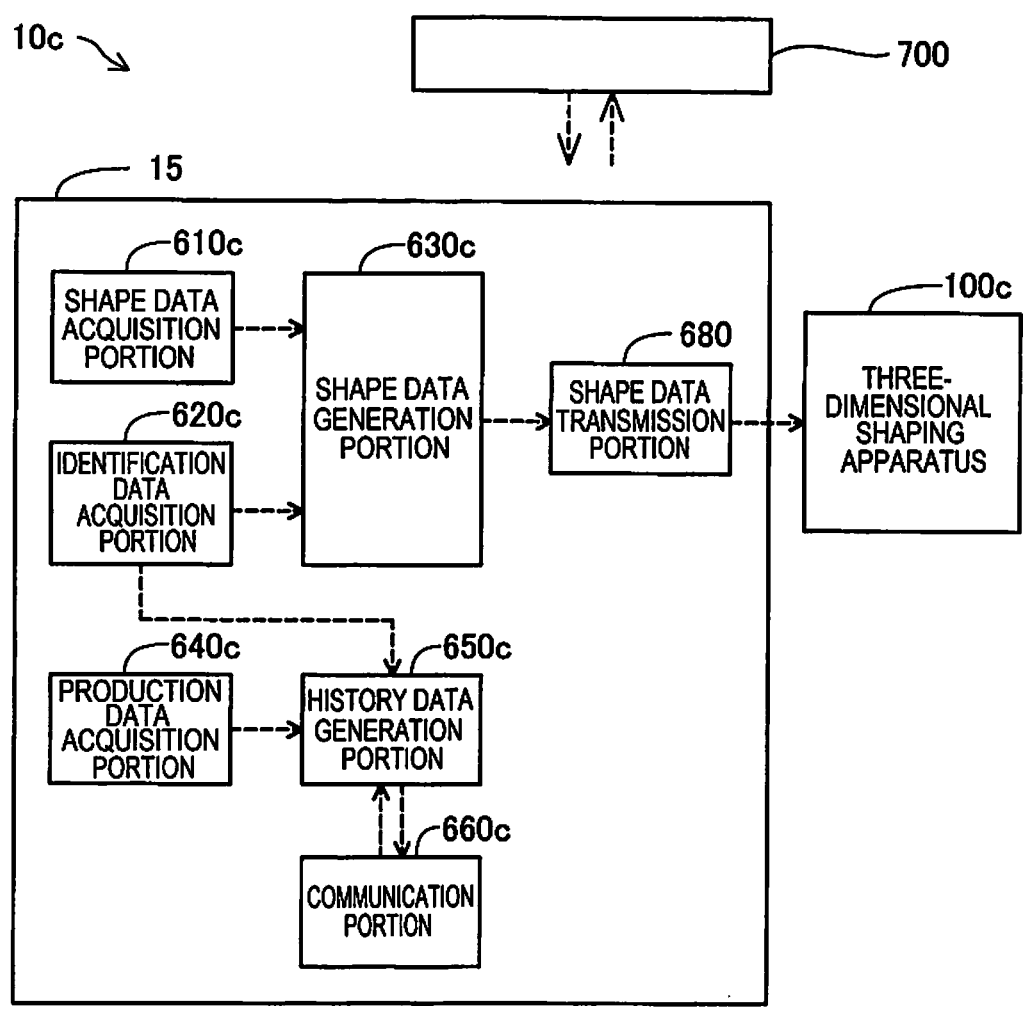
FIG. 16 is an explanatory view showing a schematic configuration of a three-dimensional shaping system as another embodiment.

C. Other Embodiments (C1) FIG. 16 is an explanatory view showing a schematic configuration of a three-dimensional shaping system 10c as another embodiment. The three-dimensional shaping system 10c includes a three-dimensional shaping apparatus 100c, a data processing apparatus 15, and a server 700. The configuration of the three-dimensional shaping apparatus 100c in the three-dimensional shaping system 10c is the same as the configuration in which the data processing portion 600 is excluded from the three-dimensional shaping apparatus 100 of the first embodiment. The data processing apparatus 15 is provided outside the three-dimensional shaping apparatus 100c. The data processing apparatus 15 includes a shape data acquisition portion 610c, an identification data acquisition portion 620c, a shape data generation portion 630c, a production data acquisition portion 640c, a history data generation portion 650c, a communication portion 660c, and a shape data transmission portion 680. The shape data acquisition portion 610c, the identification data acquisition portion 620c, the shape data generation portion 630c, the production data acquisition portion 640c, the history data generation portion 650c, and the communication portion 660c have the same functions as the shape data acquisition portion 610, the identification data acquisition portion 620, the shape data generation portion 630, the production data acquisition portion 640, the history data generation portion 650, and the communication portion 660 in the data processing portion 600 of the first embodiment. The shape data transmission portion 680 is configured to be able to communicate with the three-dimensional shaping apparatus 100c by wire or wirelessly, and transmits the second shape data generated by the shape data generation portion 630c to the three-dimensional shaping apparatus 100c. In this embodiment, the data processing apparatus 15 is constituted by a computer including one or more processors, a main storage device, and an input/output interface for performing signal input/output to/from the outside. The data processing apparatus 15 exhibits various functions by execution of a program or a command read on the main storage device by the processor. Further, the three-dimensional shaping apparatus 100c may have a configuration in which the data processing portion 600b is excluded from the three-dimensional shaping apparatus 100b of the second embodiment, and the data processing apparatus 15 may have the same function as the data processing portion 600b of the second embodiment, and also may be configured to include the above-mentioned shape data transmission portion 680.

(C2) In the three-dimensional shaping system 10 or 10b of each embodiment described above, the shape SN representing the identification information is formed in a projecting shape at a face of the three-dimensional shaped article OB. On the other hand, the shape SN representing the identification information may be formed in a recessed shape at a face of the three-dimensional shaped article OB. The recessed shape means a state where the shape SN representing the identification information is recessed below the peripheral face in the three-dimensional shaped article OB so that the volume of the three-dimensional shaped article OB represented by the second shape data becomes smaller than the volume of the three-dimensional shaped article represented by the first shape data. The shape data generation portion 630 can generate the second shaping path data PD2 for forming the shape SN representing the identification information in a recessed shape at a face of the three-dimensional shaped article OB by dividing and editing the shaping path included in the first shaping path data PD1. In this case, abrasion of the shape SN representing the identification information can be made less likely to occur as compared with the form in which the shape SN representing the identification information is formed in a projecting shape at a face of the three-dimensional shaped article OB.

(C3) In the three-dimensional shaping system 10 or 10b of each embodiment described above, the shape SN representing the identification information is represented by a letter or a symbol. On the other hand, the shape SN representing the identification information may be represented by a barcode or a two-dimensional code. In this case, more information can be added to the three-dimensional shaped article OB as compared with the form in which the shape SN representing the identification information is represented by a letter or a symbol. For example, in a barcode or a two-dimensional code, other than the identification information, the production information can be recorded. In addition, the shape SN representing the identification information may be formed in the three-dimensional shaped article OB using a woven pattern watermarking technique. The woven pattern watermarking technique refers to a technique for embedding information by forming projections and recesses that cannot be recognized by the naked eye in a medium. By reading the medium with a scanner, the information embedded in the medium is taken out. By uniformly forming projections and recesses of a woven pattern watermark in the three-dimensional shaped article OB, the embedded identification information can be acquired even in a state where the three-dimensional shaped article OB is broken.

(C4) In the three-dimensional shaping system 10 or 10b of each embodiment described above, the first shaping path data PD1 is used as the first shape data, and the second shaping path data PD2 is used as the second shape data. On the other hand, as the first shape data and the second shape data, three-dimensional CAD data may be used. In this case, for example, a function as a slicer is incorporated in the shape data generation portion 630, and the shape data generation portion 630 generates the second shaping path data PD2 using the supplied three-dimensional CAD data and the identification data.

(C5) In the three-dimensional shaping system 10 of the first embodiment described above, the material storage portion 20 of the three-dimensional shaping apparatus 10 may be constituted by a cartridge housing a recycled material. The system may be configured such that the cartridge has a built-in chip in which the identification information of an already used three-dimensional shaped article used as a raw material of the recycled material housed in the cartridge is stored, and by electrically coupling a connector of the cartridge and a connector provided in the three-dimensional shaping apparatus 100, the identification information stored in the chip is acquired as a part of the production information of the newly produced three-dimensional shaped article OB.

(C6) In the three-dimensional shaping system 10b of the second embodiment described above, the reading portion 140b, the determination portion 670, and the grinding portion 25 are not provided in the three-dimensional shaping apparatus 100b, and the reading portion 140b, the determination portion 670, and the grinding portion 25 may be configured as a separate unit. For example, a unit in which a belt conveyor, the reading portion 140b, the determination portion 670, and the grinding portion 25 are combined can be formed. In this unit, the reading portion 140b is provided above the belt conveyor. The grinding portion 25 is provided downstream of the reading portion 140b on the belt conveyor. The grinding portion 25 is constituted by a crusher crushing an already used three-dimensional shaped article. With respect to the already used three-dimensional shaped article conveyed by the belt conveyor, the identification information is scanned by the reading portion 140b, and it is determined whether the already used three-dimensional shaped article is ground by the grinding portion 25 to form a recycled material by the determination portion 670. When it is determined that the already used three-dimensional shaped article is ground by the grinding portion 25 to form a recycled material, the already used three-dimensional shaped article is conveyed to the grinding portion 25 and ground by the grinding portion 25. The ground already used three-dimensional shaped article may be automatically supplied to the material storage portion 20b of the three-dimensional shaping apparatus 100b by the belt conveyor. When it is not determined that the already used three-dimensional shaped article is ground by the grinding portion 25 to form a recycled material, it may be conveyed to a disposal box without being conveyed to the grinding portion 25.

(C7) In each embodiment described above, the three-dimensional shaped article OB including the shape SN representing the identification information is produced using the three-dimensional shaping apparatus 100 or 100b, in which at least a part of the material is melted by the rotation of the flat screw 40 and heating by the built-in heater 58 in the barrel 50, thereby forming the shaping material, and the formed shaping material is ejected from the nozzle 61 and stacked on the shaping stage 300. On the other hand, for example, the three-dimensional shaped article OB including the shape SN representing the identification information may be produced using various systems such as an FDM (Fused Deposition Modeling) system in which a filament-like material is melted and stacked, an inkjet system, a DMD (Direct Metal Deposition) system, or a powder bed fusion system.

D. Other Aspects

The present disclosure is not limited to the above-mentioned embodiments, but can be realized in various aspects without departing from the gist thereof. For example, the present disclosure can also be realized in the following aspects. The technical features in the above-mentioned embodiments corresponding to technical features in the respective aspects described below may be appropriately replaced or combined for solving part or all of the problems of the present disclosure or achieving part or all of the effects of the present disclosure. Further, the technical features may be appropriately deleted unless they are described as essential features in the present specification.

(1) According to the first aspect of the present disclosure, a three-dimensional shaping apparatus coupled to a server is provided. This three-dimensional shaping apparatus includes a melting portion melting a material to form a shaping material, an ejection portion ejecting the shaping material supplied from the melting portion, a shaping stage where the shaping material ejected from the ejection portion is stacked, a moving mechanism changing a relative position of the ejection portion and the shaping stage, a shape data generation portion generating second shape data for representing a shape of a three-dimensional shaped article including a shape representing identification information for identifying the three-dimensional shaped article using first shape data and the identification information for identifying the three-dimensional shaped article, a controller controlling the melting portion and the moving mechanism according to the second shape data, thereby producing the three-dimensional shaped article, and a communication portion transmitting the identification information for identifying the three-dimensional shaped article and production information of the three-dimensional shaped article to the server.

According to the three-dimensional shaping apparatus of this aspect, a three-dimensional shaped article including a shape representing identification information for identifying the three-dimensional shaped article is produced, and the identification information and production information of the three-dimensional shaped article are transmitted to a server. Therefore, the production information of the three-dimensional shaped article managed by the server can be identified using the shape representing the identification information included in the produced three-dimensional shaped article.

(2) The three-dimensional shaping apparatus of the above aspect may include an acquisition portion acquiring identification information of a recycled three-dimensional shaped article to be recycled as a recycled material as a part of the production information of the three-dimensional shaped article when the recycled three-dimensional shaped article is included in the material to be supplied to the melting portion.

According to the three-dimensional shaping apparatus of this aspect, the production information of the recycled three-dimensional shaped article can be acquired together with the production information of the three-dimensional shaped article managed by the server using the shape representing the identification information included in the produced three-dimensional shaped article.

(3) The three-dimensional shaping apparatus of the above aspect may include a determination portion acquiring the production information of the recycled three-dimensional shaped article from the server using the identification information of the recycled three-dimensional shaped article acquired by the acquisition portion, and determining whether the recycled three-dimensional shaped article is ground using the production information of the recycled three-dimensional shaped article, and a grinding portion grinding the recycled three-dimensional shaped article when it is determined by the determination portion that the recycled three-dimensional shaped article is ground.

According to the three-dimensional shaping apparatus of this aspect, it is determined whether the recycled three-dimensional shaped article is ground using the production information of the recycled three-dimensional shaped article, and the recycled three-dimensional shaped article can be ground according to the determination result.

(4) In the three-dimensional shaping apparatus of the above aspect, the shape data generation portion may generate the second shape data for representing the shape of the three-dimensional shaped article including a shape of a barcode or a two-dimensional code as the shape representing the identification information for identifying the three-dimensional shaped article.

According to the three-dimensional shaping apparatus of this aspect, more information can be added as compared with the aspect in which the shape representing the identification information is formed with a letter or a symbol.

(5) In the three-dimensional shaping apparatus of the above aspect, the shape data generation portion may generate the second shape data for representing the shape of the three-dimensional shaped article including the shape representing the identification information for identifying the three-dimensional shaped article at a plurality of sites.

According to the three-dimensional shaping apparatus of this aspect, even if the three-dimensional shaped article is broken, failure in reading the identification information can be suppressed.

(6) According to a second aspect of the present disclosure, a three-dimensional shaping system is provided. This three-dimensional shaping system includes a three-dimensional shaping apparatus, a data processing apparatus, and a server. The three-dimensional shaping apparatus includes a melting portion melting a material to form a shaping material, an ejection portion ejecting the shaping material supplied from the melting portion, a shaping stage where the shaping material ejected from the ejection portion is stacked, a moving mechanism changing a relative position of the ejection portion and the shaping stage, and a controller controlling the melting portion and the moving mechanism, the data processing apparatus includes a shape data generation portion generating second shape data for representing a shape of a three-dimensional shaped article including a shape representing identification information for identifying the three-dimensional shaped article using first shape data and the identification information for identifying the three-dimensional shaped article, a shape data transmission portion transmitting the second shape data to the three-dimensional shaping apparatus, and a communication portion transmitting the identification information for identifying the three-dimensional shaped article and production information of the three-dimensional shaped article to the server, and the controller of the three-dimensional shaping apparatus controls the melting portion and the moving mechanism according to the second shape data, thereby producing the three-dimensional shaped article.

According to the three-dimensional shaping system of this aspect, a three-dimensional shaped article including a shape representing identification information for identifying the three-dimensional shaped article is produced, and the identification information and production information of the three-dimensional shaped article are transmitted to a server. Therefore, the production information of the three-dimensional shaped article managed by the server can be identified using the shape representing the identification information included in the produced three-dimensional shaped article.

(7) According to a third aspect of the present disclosure, a three-dimensional shaped article production method is provided. This three-dimensional shaped article production method includes acquiring first shape data, acquiring identification information for identifying a three-dimensional shaped article, generating second shape data for representing a shape of the three-dimensional shaped article including a shape representing the identification information for identifying the three-dimensional shaped article using the first shape data and the identification information for identifying the three-dimensional shaped article, producing the three-dimensional shaped article according to the second shape data, and transmitting the identification information for identifying the three-dimensional shaped article and production information of the three-dimensional shaped article.

According to the three-dimensional shaped article production method of this aspect, a three-dimensional shaped article including a shape representing identification information for identifying the three-dimensional shaped article is produced, and the identification information and production information of the three-dimensional shaped article are transmitted to a server. Therefore, the production information of the three-dimensional shaped article managed by the server can be identified using the shape representing the identification information included in the produced three-dimensional shaped article.

The present disclosure can also be realized in various aspects other than the three-dimensional shaping system. For example, it can be realized in aspects of a three-dimensional shaping apparatus, a three-dimensional shaping apparatus controlling method, a three-dimensional shaped article production method, etc.

What is claimed is:

1. A three-dimensional shaping apparatus coupled to a server, the apparatus comprising:
   a grinding portion;
   a melting portion melting a material to form a shaping material;
   an ejection portion ejecting the shaping material supplied from the melting portion;
   a shaping stage where the shaping material ejected from the ejection portion is stacked;
   a moving mechanism changing a relative position of the ejection portion and the shaping stage; and
   a controller
      configured to generate second shape data for representing a shape of a three-dimensional shaped article to be produced from the shaping material, using first shape data and identification information that identifies the three-dimensional shaped article to be produced from the shaping material, such that the shape of the three-dimensional shaped article includes a shape representing the identification information,
      configured to control the melting portion and the moving mechanism according to the second shape data, thereby producing the three-dimensional shaped article that includes the shape of the identification information,
      configured to generate history data after the three-dimensional shaped article has been produced under control of the controller according to the second shape data, the history data including the identification information shown on the three-dimensional shaped article that has been produced, and including production information that has generation of the three-dimensional shaped article indicating a number of times the material used in production of the three-dimensional shaped article has been recycled,
      configured to transmit the history data to the server, and
      configured to acquire the production information of a recycled three-dimensional shaped article from the server using the identification information of the recycled three-dimensional shaped article, and configured to determine whether the recycled three-dimensional shaped article is to be ground using the production information of the recycled three-dimensional shaped article, wherein
   the grinding portion grinds the recycled three-dimensional shaped article when it is determined by the controller that the recycled three-dimensional shaped article is to be ground.

2. The three-dimensional shaping apparatus according to claim 1, wherein the controller is configured to include the identification information of the recycled three-dimensional shaped article as a part of the production information of the three-dimensional shaped article when the recycled three-dimensional shaped article is included in the material to be supplied to the melting portion.

3. The three-dimensional shaping apparatus according to claim 1, wherein the controller is configured to generate the second shape data for representing the shape of the three-dimensional shaped article including a shape of a barcode or a two-dimensional code as the shape representing the identification information that identifies the three-dimensional shaped article.

4. The three-dimensional shaping apparatus according to claim 1, wherein the controller is configured to generate the second shape data for representing the shape of the three-dimensional shaped article including the shape representing the identification information that identifies the three-dimensional shaped article at a plurality of sites.

5. A three-dimensional shaping system, comprising a three-dimensional shaping apparatus, a data processing apparatus, and a server, wherein the three-dimensional shaping apparatus includes:
   a grinding portion;
   a melting portion melting a material to form a shaping material;
   an ejection portion ejecting the shaping material supplied from the melting portion;
   a shaping stage where the shaping material ejected from the ejection portion is stacked;
   a moving mechanism changing a relative position of the ejection portion and the shaping stage; and
   a controller configured to control the melting portion and the moving mechanism,
   the data processing apparatus includes
   a controller
      configured to generate second shape data for representing a shape of a three-dimensional shaped article to be produced from the shaping material, using first shape data and identification information that identifies the three-dimensional shaped article to be produced from the shaping material, such that the shape of the three-dimensional shaped article includes a shape representing the identification information,
      configured to transmit the second shape data to the three-dimensional shaping apparatus,
      configured to generate history data after the three-dimensional shaped article has been produced under control of the controller of the three-dimensional shaping apparatus according to the second shape data, the history data including the identification information shown on the three-dimensional shaped article that has been produced, and including production information that has a generation of the three-dimensional shaped article indicating a number of times the material used in production of the three-dimensional shaped article has been recycled, and
      configured to transmit the history data to the server, and
   the controller of the three-dimensional shaping apparatus is configured to control the melting portion and the moving mechanism according to the second shape data, thereby producing the three-dimensional shaped article that includes the shape of the identification information;
   and
      configured to acquire the production information of a recycled three-dimensional shaped article from the server using the identification information of the recycled three-dimensional shaped article, and configured to determine whether the recycled three-dimensional shaped article is to be ground using the production information of the recycled three-dimensional shaped article, wherein the grinding portion grinds the recycled three-dimensional shaped article when it is determined by the controller that the recycled three-dimensional shaped article is to be ground.

6. A three-dimensional shaped article production method for producing the three-dimensional shaped article by the three-dimensional shaping apparatus according to claim 1, the method comprising:

acquiring the first shape data;

acquiring the identification information that identifies the three-dimensional shaped article to be produced from the shaping material;

acquiring the production information of a recycled three-dimensional shaped article from a server using the identification information of the recycled three-dimensional shaped article, and determining whether the recycled three-dimensional shaped article is to be ground using the production information of the recycled three-dimensional shaped article;

grinding the recycled three-dimensional shaped article when it is determined by the controller that the recycled three-dimensional shaped article is to be ground;

generating the second shape data for representing the shape of the three-dimensional shaped article to be produced from the shaping material, such that the shape of the three-dimensional shaped article includes a shape representing the identification information;

producing the three-dimensional shaped article that includes the shape of the identification information according to the second shape data;

generating the history data after the three-dimensional shaped article has been produced according to the second shape data, the history data including the identification information shown on the three-dimensional shaped article that has been produced, and including the production information that has a generation of the three-dimensional shaped article indicating a number of times the material used in production of the three-dimensional shaped article has been recycled; and transmitting the history data to the server.

* * * * *